United States Patent [19]

Lehmacher

[11] 4,128,049
[45] Dec. 5, 1978

[54] APPARATUS FOR MANUFACTURE OF PAD STACKED BAGS OR THE LIKE

[76] Inventor: Hans Lehmacher, Hummerich, 5216 Niederkassel-Mondorf, Fed. Rep. of Germany

[21] Appl. No.: 632,141

[22] Filed: Nov. 14, 1975

Related U.S. Application Data

[63] Continuation-in-part of Ser. No. 282,193, Jul. 17, 1972, Pat. No. 3,966,524, and Ser. No. 567,073, Apr. 10, 1975, Pat. No. 4,046,257.

[30] Foreign Application Priority Data

| Aug. 17, 1971 | [DE] | Fed. Rep. of Germany | 2141045 |
| Jun. 19, 1972 | [DE] | Fed. Rep. of Germany | 2229728 |
| Jul. 7, 1972 | [DE] | Fed. Rep. of Germany | 2233408 |
| Jul. 26, 1972 | [DE] | Fed. Rep. of Germany | 2236523 |

[51] Int. Cl.² .......................................... B31B 23/00
[52] U.S. Cl. .............................. 93/33 H; 93/84 FF; 93/93 HT; 156/512; 156/558; 156/563
[58] Field of Search ............... 156/512, 510, 558, 563; 93/33 H, 35 R, 8 R, DIG.1, 93 HT, 33 R, 84 FF, 20

[56] References Cited

U.S. PATENT DOCUMENTS

| 2,973,797 | 3/1961 | Sylvester | 156/251 X |
| 3,210,908 | 10/1965 | Samberg | 53/182 |
| 3,384,528 | 5/1968 | Lehmacher et al. | 93/33 H |
| 3,431,828 | 3/1969 | Crawford et al. | 93/20 X |
| 3,587,410 | 6/1971 | Dechanciaux | 93/33 H |

FOREIGN PATENT DOCUMENTS 1486997 9/1969 Fed. Rep. of Germany .......... 93/33 H

Primary Examiner—James F. Coan
Attorney, Agent, or Firm—Michael J. Striker

[57] ABSTRACT

Sections successively severed from a double layer web of synthetic thermoplastic film, e.g., flattened tube stock, as produced are each stacked and welded to a precedingly stacked section near one edge, or in a tear off part or hanger portion to which a bag portion of the section is attached; forming ultimately a pad of bag sections, wherein each section includes either a complete bag or a partially completed bag, in the latter case with certain final bag producing operations carried out simultaneously for all bags already brought together and preferably welded together in a pad structure.

Apparatus is disclosed including various web welding, seaming, perforating and/or severing devices operating in horizontal planes upon a preferably vertically fed stock web, and below the aforesaid devices, either associated with a welding beam element or independently thereof, devices for adding each successive bag to a stack with welding to a proceeding bag, and as well a lay off table for grippingly accepting a desired finished bag pad and laying it off onto a horizontal running, product-discharging conveyor belt. Apparatus variations are disclosed for carrying out certain of the above and other operations on the web, while horizontal or vertical, before severance of sections, e.g., in carrying out methods of producing a plurality of bags simultaneously from a wide web stock continuously longitudinally divided into a corresponding plurality of narrower "sub-webs".

62 Claims, 29 Drawing Figures

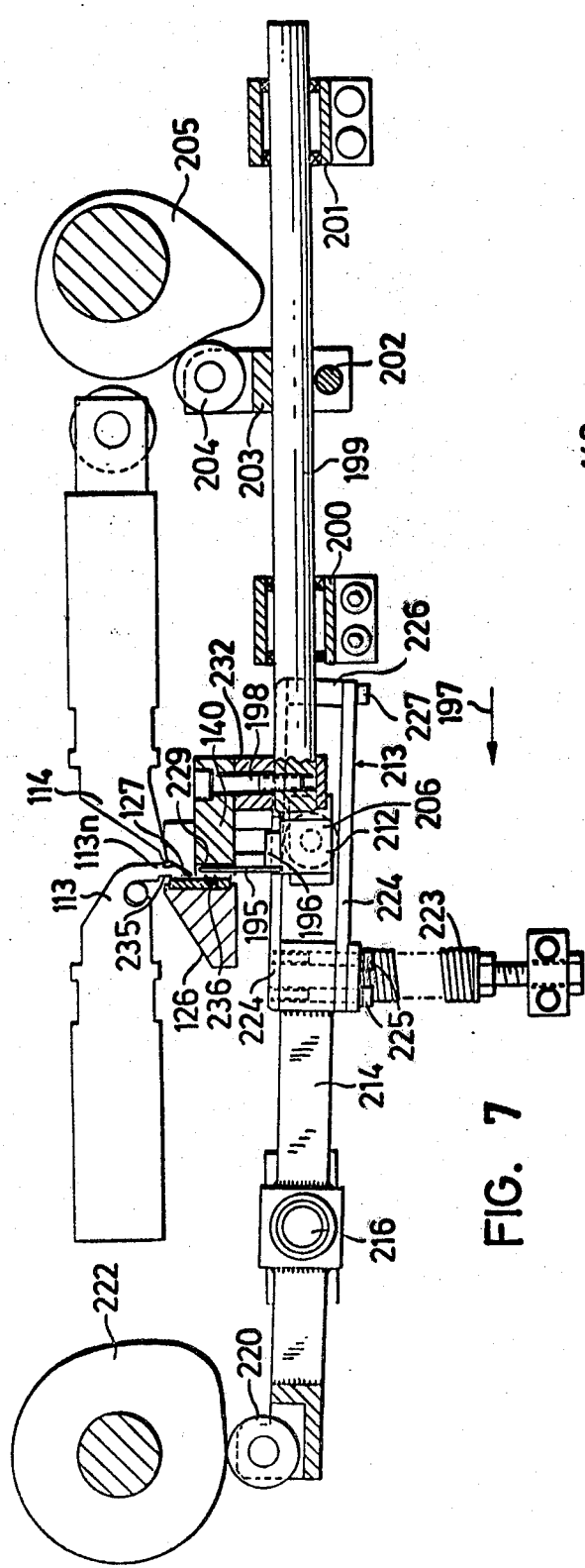
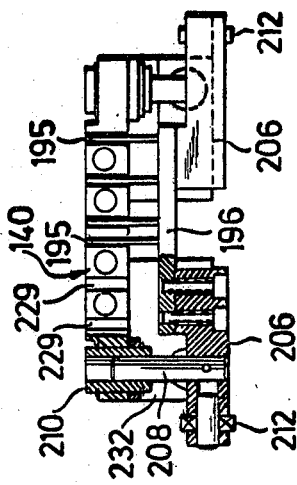
FIG. 7
FIG. 9

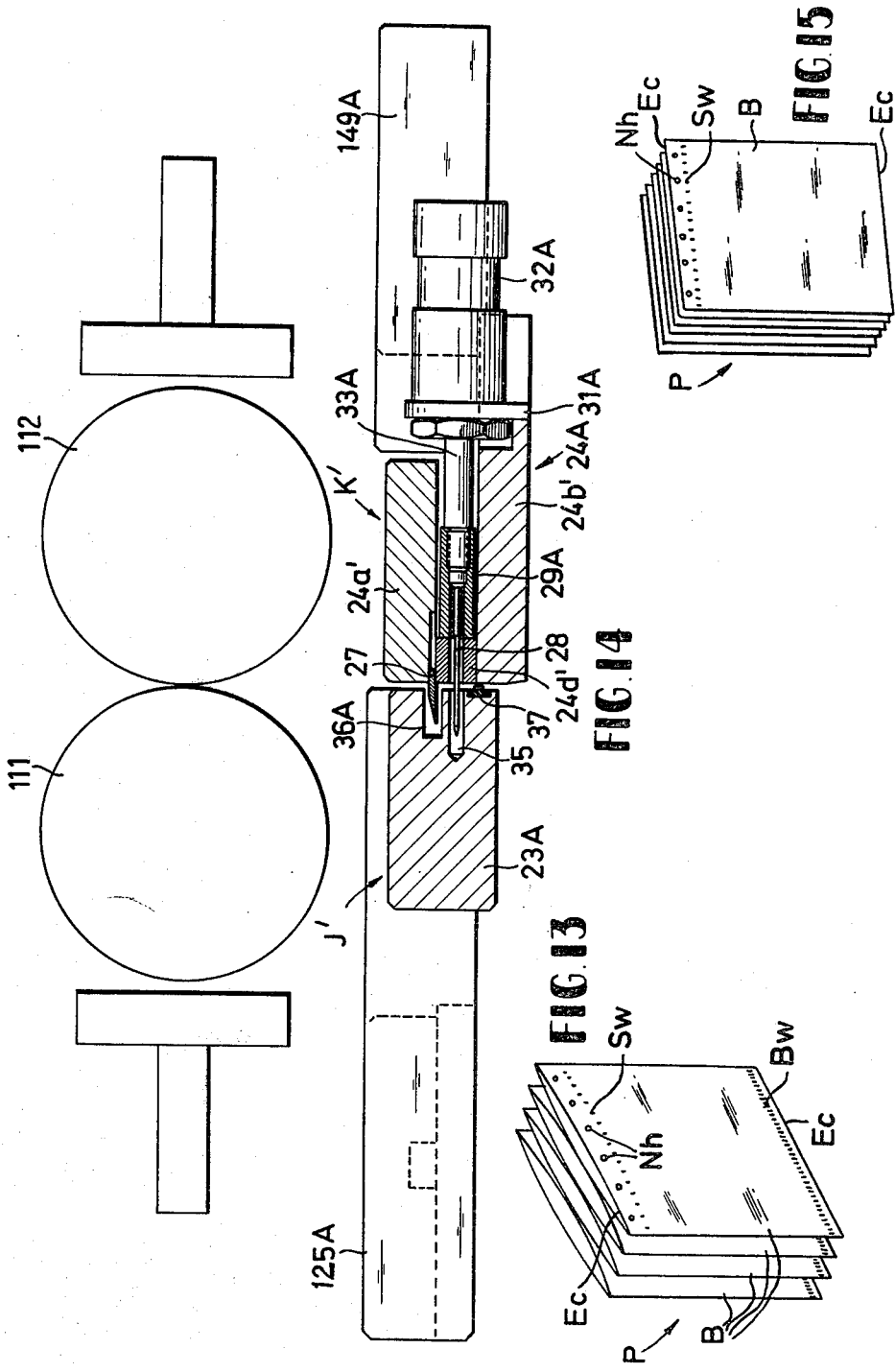

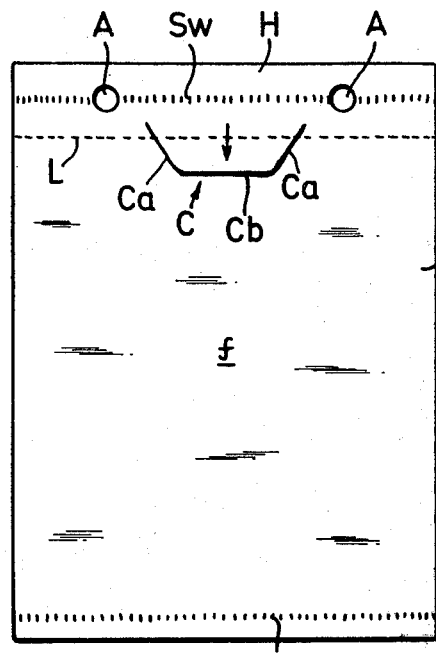
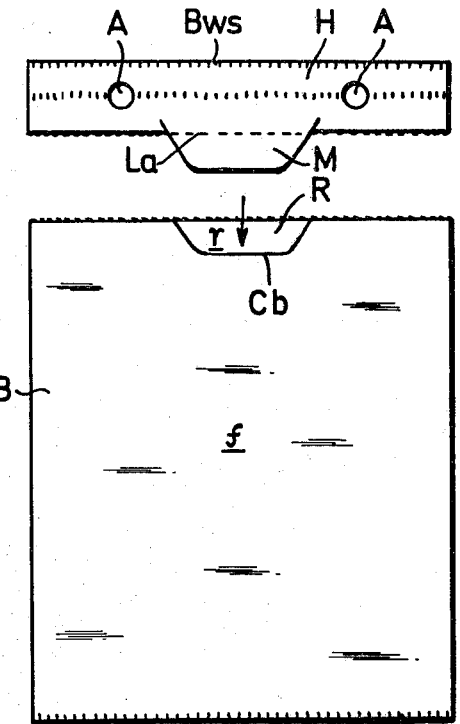
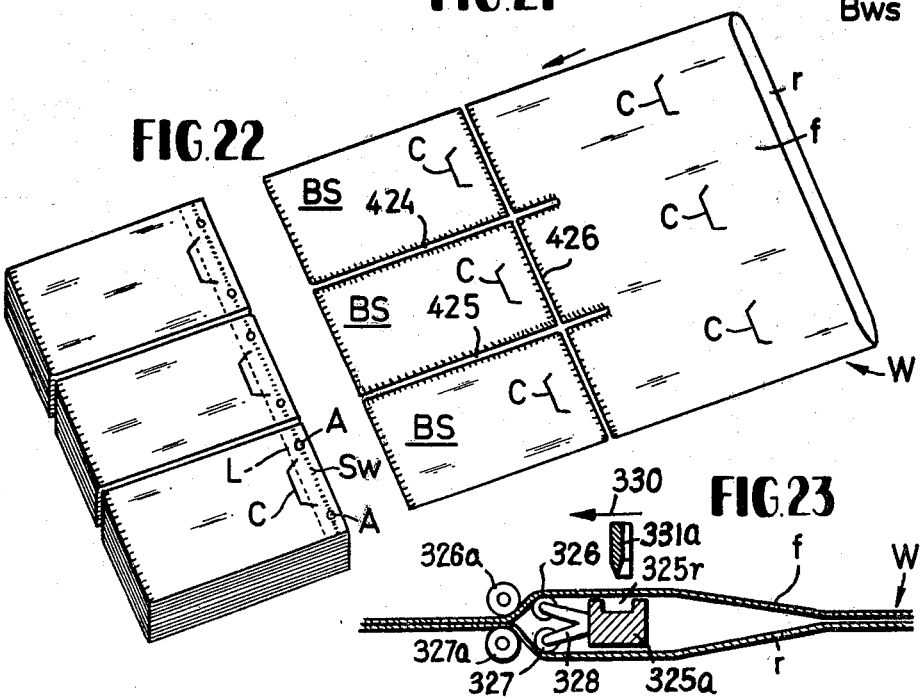
FIG.20
FIG.21
FIG.22
FIG.23

APPARATUS FOR MANUFACTURE OF PAD STACKED BAGS OR THE LIKE

This application is a continuation-in-part of copending application, Ser. No. 282,193, filed July 17, 1972; now U.S. Pat. No. 3,966,524, granted June 29, 1976; and also of Ser. No. 567,073, filed Apr. 10, 1975 now U.S. Pat. No. 4,046,257.

Hereinafter there will be discussed bags which are put into pad form as parts of respective sections severed from a continuous web with certain excess material used as a suspension portion, from which the bag portion is delineated by a line of tear-off perforations, each suspension portion being left in the pad as the respective pad is torn off for use; and also bags which are put in pad form by a light welding in a marginal region which allows each bag to be cleanly torn off from the pad, without leaving a discrete suspension portion behind. Hence at times, for simplicity of discussion, a severed web section will be referred to simply as a "bag", whether the section itself represents the material of only a bag or of a bag portion plus a suspension portion.

The present invention is concerned with apparatus for the manufacture of a pad of stacked bags, especially carrying bags or like packaging made of thermoplastic synthetic plastic film, and welded to one another into a pad from which individual bags may be torn off as at the time of use.

By certain known prior art methods and apparatus, thermoplastic film bags are made with stacking apertures whereby, immediately after each bag is completed, it is received on chain-supported paired stacking rods in the bag making apparatus thus to build up a stack of desired number of bags. Then by chain movement the stack is moved away, so that stacking can proceed on a successive rod pair brought into place by the chain. Hitherto the bag stack has been removed from the rods by hand, generally with some displacement of the bags in the stack. To prevent further displacement of bags after stack removal from the rods, at times a rubber band has been placed on the stack to hold the bags together.

By another approach appearing in the Dechanciaux U.S. Pat. No. 3,587,410, bag sections made from a horizontally fed thermoplastic flattened tubular film web are successively fed onto a stacking support over preceding stacked sections and there clamped for severing from the web, and during other operations on a next bag section.

Also by prior art, after removal from the rods the bag stack has been carried to a device for welding the bags together in one operation into a block or pad assuring their being held together. This operation has usually used hot rods or needles highly heated to penetrate the bag stack easily. Such work, basically carried out by hand, is very expensive labor-wise, and also represents a strongly malodorous disagreeable operation because of resultant partial thermal decomposition, combustion or gasification of the plastic.

A purpose and object of the present invention is to simplify the stacking, and the securement by welding, of the bags into a pad, while avoiding certain other disadvantages of the prior art. For the attainment of this object, methodwise, by the present invention, as each bag is added to the stack, it is welded to the preceding bag, thereby requiring relatively slight heat energy and lower temperature, for each welding, and with the stacking and welding of each individual bag into the pad being carried out as in a single operation.

In this operation, the bags may be welded at or in the region near to their upper edges, or even at some other edge, but in any event in a manner such that the welding of the bags to one another requires use of only a slight excess of film.

This approach of the invention is applicable with quite diverse structures of the bags thus produced in pad form, and as well with considerable variation in method for fabrication of the bags as such.

However, certain aspects of the disclosed apparatus are advantageous even where stacked sections are not simultaneously welded into a pad.

The invention may be also advantageously carried out with bags which are stacked either horizontally or vertically. However, in a particularly advantageous way of carrying out the invention, flattened tubular plastic film stock is fed substantially vertically to a welding seaming device operatively moved in a horizontal plane, i.e., direction, and the stacking, and simultaneously therewith welding, of successive bags to the stacked pad is carried out with a substantially vertical and pendant disposition of the bags. By this procedure films with very slight wall thickness can be worked into bags inasmuch as the hanging vertical disposition obviates or extensively diminishes billowing and the formation of folds or like distortions. Further to prevent displacement with very thin film bag material of the invention the individual severed sections or bags are supported at both sides during downward advance, in a vertical or nearly vertical plane, by similarly downwardly directed air stream which additionally straighten out the bags and also accelerate the transport of the very thin films.

This vertical feed and pendant disposition is advantageous where the fed web is comprised of tubular stock or sheet stock folded over to "half-tubular" form and the stacking of bags in a vertical plane is also advantageous for bags of intermediate or heavy film material.

Apparatus-wise the invention is characterized by a device for separating from the web successively fed web increments, as by devices for simple severance, or web weld-seaming and preferably for web severing, with elements operatively movable in a horizontal plane, especially as welding bars, one or both of which are movable, and capable of assuming quite various forms of construction. Thus as such device a welding roll in combination with an opposed heated wedge can be used; or also two heated welding bars both of which on their co-operating opposed welding surfaces are provided with a groove in which there is located an either heated or cold web severing knife. Likewise both welding bars of the aforedescribed type can remain cold, and serve as clamping bars, with a heated knife then being used as a weld-seaming and simultaneously severing device.

Also one or both welding bars can be cam-actuated against spring pressure. Thus each welding bar may be carried on a respective support beam shiftable, against the pressure of springs, by a pair of like cam disks on a cam drive shaft lying in the plane of and extending parallel to the welding beams. This constructional expedient both places the cam shafts in close proximity to the welding bars and is especially advantageous as involving comparatively simple and low cost construction.

Further, with the welding bars operating in a horizontal plane on a vertical web end portion and effecting severance, from the web leading end, of a section, one of the two welding bars has a preferably longitudinally coextensive downward projection or lip of which the back side, away from the bar's welding surface, cooperates in a stacking mechanism with a clamping bar, to clamp a bag or bag section in a pendant stack immediately after completion of welding bar work thereon and severance from the web. However, this clamping function of the welding bar lip may be assumed by a second clamping bar independent of, and accordingly displaceable relative to, the welding bars.

By provision of a welding device on the clamping face of either the welding bar lip or the independent second clamping bar, simultaneously with application of each bag section to the pendant stack it is welded to the precedingly stacked section.

Either or both of these two successive welding devices can be of the type forming a line of welded points, but especially advantageously each such welding device is comprised of an electrically heated resistance wire or strip, which is covered by a heat resistant sheet of film such as "Teflon".

The bag clamping bar is moved by an opposed pressure bar and can be provided with stacking pins. The pressure bar is then provided with the welding device for connecting the bags as they are stacked.

By a particular apparatus embodiment of the invention, a web section engaging pusher device of a rake-like form is located between the clamping bar and the pressure bar. The pusher engages the respective upper regions of the individual bag sections or bags and presses their top margins behind either the projecting lip of the welding bar or of the aforementioned independent clamping bar or part of the second welding element. By use of this positive mechanical bending or displacement of the respective upper margin regions of the severed bags, the effects of variations in the film thickness and stiffness are substantially obviated. Since the pusher is moved in unison with the film working machine assemblies, the stacking proceeds as rapidly as the manufacture of the bags, and no delays arise.

By another modification of the invention, each successive increment of the fed web, corresponding to a web section intended for a pad stack, is impaled upon sharp pins, on which in effect the stack is maintained as it is built up, thereby separating the stack sustaining function from welding jaws which are used to form structural seams of the bag as such, though there is a preferred common drive for the stacking devices as well as bag seaming jaws or web severing devices in the apparatus. When the stack is to be released for discharge at appropriate times, the pins are retracted from the stack for this purpose. The weld-stacking, that is, welding of each section to a preceding section as it is added to the stack, is advantageously carried out by stacking welding means closely associated with the stacking device. But the latter device may be non-energized, and yet the sections maintained in a stack form, until the stack has been built up and then by other means come to be maintained as a unit before pin withdrawal.

By one particular and useful arrangement, to discharge the bags, stacked in a vertical plane and welded into a pad, first the vertical pad is grasped by a clamping device, the stacking device released, the pad laid off upon a conveyor belt, the clamping device released and then the pad carried off by starting the belt.

Other objects and advantages and inventive features will appear from the following description and the drawings wherein:

FIG. 2a is an enlarged detail section of a stacking device appearing in FIG. 2;

FIG. 3 is a top plan view of welding bar and actuating mechanism of FIG. 2, with omission of the web advance rolls, cooperating guide combs and associated structures;

FIG. 7 is a side view partially in elevation, partially in section, of an apparatus modification in the stacking device, certain parts of the web welding devices being also shown in outline form, the view being taken substantially at the line VII—VII in FIG. 8;

FIG. 9 is a detail view in elevation taken at the line IX—IX in FIG. 8, but partially broken away for clarity of representation;

FIG. 13 shows a pad of bags producible by the apparatus of FIG. 11;

FIG. 14 is a view similar to FIG. 11 of parts modified from FIG. 11 and simplified for merely severing and weld-stacking bag sections;

FIG. 15 shows a pad of web sections producible by the apparatus of FIG. 14;

FIG. 20 is a front elevational view of another tear-off bag web section;

Figure 17:
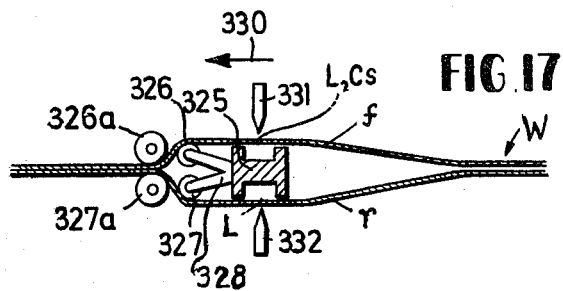
FIG. 17 is a vertical sectional view through a film tube web having a "floating" rail element disposed therein to afford reaction surfaces co-operating with external apparatus elements operating from opposite sides of the web.
Figure 24:
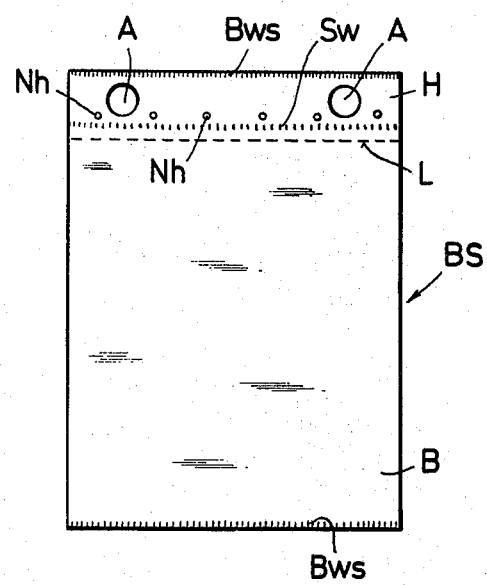
Figure 25:
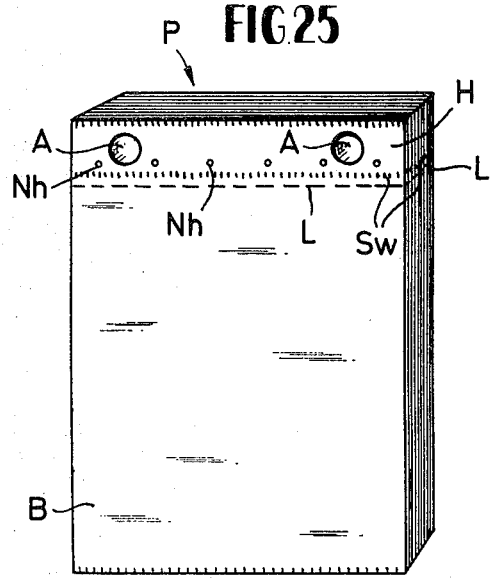
Figure 26:
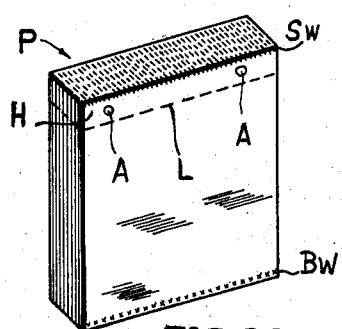
Figure 27:
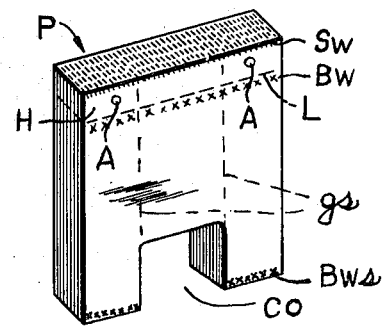
Figure 28:
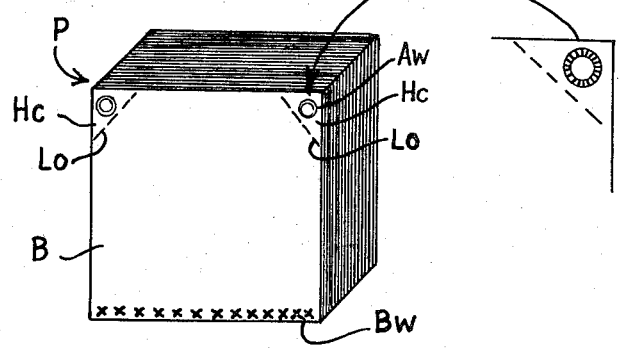

FIG. 21, similar to FIG. 20 shows a torn-off bag and the respective suspension or hanger part;

FIG. 22 by a perspective schematic view of a web represents a method for production of pads with a FIG. 20 type of tear-off bags;

FIG. 23 is a fragmentary vertical longitudinal section through a film tube and an incising device, similar to FIG. 17, as a part of apparatus for effecting the method of FIG. 22;

FIG. 24 is a front elevational view of an individual web section comprising a tear-off bag and hanger part or in effect a front elevation of the pad of FIG. 25;

FIG. 25 is a generally front perspective view, of a bag pad corresponding to FIG. 24;

FIGS. 26–28 are perspective views of other bag pads.

GENERAL DESCRIPTION OF METHOD AND PRODUCTS

The improvement, by the weld-stacking of the present invention, in production of stacked padded thermoplastic film bags, is applicable to various bag designs and pad forms. Weld stacking, that is, for each bag section, separated from a continuous web, a welding of the section to, and as it is stacked on, the preceding section in the stack, is shown and described primarily with relation to, though not limited to, bags for each of which the respective "leaf" or bag section in the pad comprises a bag hanger or suspension portion, in addition to a portion which becomes the bag proper when torn off at the time of use. In this suspension portion is made the weld, at times referred to as the stacking weld, which is carried out in the weld stacking procedure; and each suspension portion has apertures or, in conjunction with the bag shape, forms an aperture with a shoulder, which aligned with like apertures or shoulders of other sections in the pad, affords purchase for pad hanging means, such as pins or a bracket, at the place of use. A perforated tear-off connection of the bag portion to the suspension portion then allows easy manual tear-off of each bag from the pad.

The wide applicability of the weld-stacking concept with various bag and pad configurations, and in various methods for production, and in product bags and pads are considered in greater detail in the parent case; appropriate apparatus for production thereof are hereinafter separately discussed.

The term "stack-welding" as herein used, means thermoplastically bonding or welding a severed web section — as it is added to a stack being built up — to the preceding section in the stack, each section either being, or corresponding to, a respective finished bag; verb, noun and participles being used with analogous meanings.

"Horizontal stacking" as herein used means horizontally shifting successive, severed vertically disposed flat web sections, in a direction perpendicular to the section plane against a preceding section on a growing vertically oriented stack. However, various aspects of the invention, particularly pertaining to apparatus, may be applied for vertical or oblique stacking.

The phrases "line of perforations", "perforation line", and the like are to be understood as meaning the preferred formation of a series of short aligned incisions or cuts alternating with at least equally short uncut portions of the film material, rather than merely round holes.

Unless context dictated otherwise, "flattened film tube", as naming a web from which bags are to be produced, includes not only extruded film tubing flattened to a two layer web, but also similar two-layer webs produced by longitudinally folding over a continuous strip and weld seaming the free edges, or by longitudinally weld-severing a larger flattened tube into two or more smaller flattened tubes, or webs.

For brevity or convenience, using the direction of traveling web advance for reference, the terms "upstream", "up" or "above" and "downstream", "down" or "below" and similar terms of direction, may be used analogically in describing relative orientation or positioning of apparatus components or functional stations.

In general, the same or similar reference legends will be applied to identical or analogous parts among modifications.

Product Bag Structures

Figure 1:
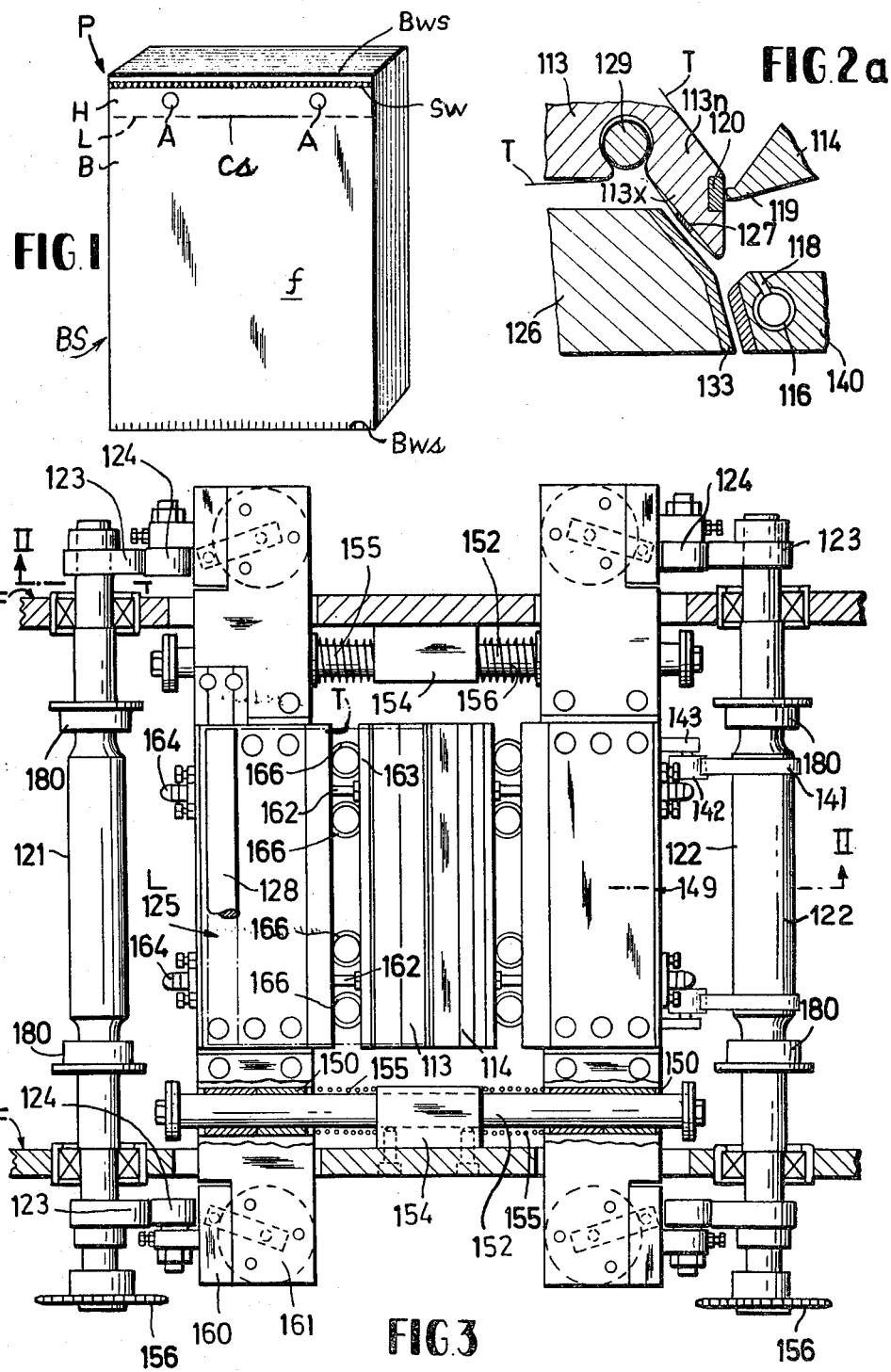
FIG. 1 is a generalized perspective view of a pad of many welded-together individual tear-off bags of one design producible by this invention.

Bags of FIG. 1

FIG. 1 represents a pad P, comprised of single bag sections BS, produced from a double-layer web of thermoplastic film, by apparatus as hereinafter described, each section comprising a transverse strip-like top hanger or suspension portion H perforated through both layers at A, A, with hanger holes; a bag portion B, separable from the hanger strip along a tear-off line defined by the transverse line of perforations L, through both the back and front walls or film layers of the section. The line of perforations is carried across the entire width of the back wall, but in the front wall "$f$" runs in from the side edges to the middle region into an aligned locally severing cut Cs, normally a straight line, but distortable as hereinafter described to facilitate bag tear-off. The bottom or top and bottom seam welds Bws or Bw (in this or other figures, which are merely exemplary of possible products of the apparatus disclosure) pertain to the particular method of making the bag. The pad P is produced by stack welding a number of such bag sections, each being stack welded to the preceding section at Sw substantially entirely across the top margin of its hanger strip H.

For use, the pad is suspended on a hanger device or bracket having prongs received in the apertures A, A. The interruption of the perforations L of the tear-off line by the severing cut Cs reduces the tearing work, and also facilitates the tear-off manipulation by one hand; for a slight downward thumb pressure, just below the line Cs on the foremost section of a hanging pad, cocks the front wall material below the cut Cs out away from the back wall. This provides a small but gaping opening for easy downward insertion of the fingers of the same hand, which then exerting a slight forward tug, tears the bag off along the perforations L in the front and back walls, with the mouth of the bag, resulting at the torn line L, then open even as it is grasped in the hand after tear-off.

Bags of FIGS. 13 and 15

In FIG. 13, pad P is merely symbolized by four bags B, depicted with the two film layers of each expanded slightly; and similarly in FIG. 15 the bags are spread, although these would be compactly flattened against each other and more numerous, as indicated in FIG. 1, in an actual product pad.

These products do not require in each severed web section a suspension portion left on the pad when the respective bag is torn off.

The top and bottom ends of these bags have shear cut edges Ec resulting from successive simple transverse severance cuts across a flat tubular web; the bottom in FIG. 13 is closed by a continuous bottom seam weld Bw just above the cut bottom edge, as may be produced by transversely seam welding across the entire web width at about the same time that a preceding section is severed; and the stacking weld Sw along a transverse line secures the bag across its width to the preceding bag. Just beneath the top edge or bag mouth and above weld Sw there appears a transverse series of perforations Nh, representing in exaggeration residual closed-up punctures where the section had been pierced in fabrication by stacking pin elements.

For the particular bag form shown in FIG. 13, the stack weld Sw to the preceding bag, though strong enough to maintain a pad form, advantageously is somewhat weak, corresponding rather to a good adhesion which allows the bag to be stripped cleanly and easily from the pad by hand. The stack weld may be a continuous weld line or a linear series of small weld spots running over the entire width, here and in other bags.

FIG. 15 represents a "bottomless" bag form, lacking the bottom seam weld but otherwise similar to the FIG. 13 bag in structure and manner of incorporation into a pad.

Bags of FIGS. 20–21

In FIGS. 20–21 the web section BS, used for pad forming, is generally similar to FIG. 1 as comprising a top suspension portion H and bag portion proper B, relatively defined by the perforation line L; though in FIG. 20 as in FIG. 13, the top and bottom present cut edges, with a simple welded seam Bw closing the bottom slightly above the cut bottom edge. The stack weld line Sw is displaced upwardly from the perforation line to pass through the hanging apertures A.

Here, in place of the straight cut Cs, made in the front film layer or panel f, in alignment with the perforation line L through both layers, there is used a central downwardly bowed or convex cut C, of a inverted arch shape, a flat bottomed U-shaped incision crossed by the perforation line L. This cut C lies principally in what becomes the top or mouth margin of a bag torn from the pad, as clearly appears in FIG. 21 showing the suspension strip H and the separated bag B, derived from a web section similar to FIG. 20, except for section layer edge-joining by welds Bws as in FIG. 24, in consequence of a severing weld type separation from the web. FIG. 21 clearly shows a central notch or recess R appearing at the front margin of the torn-off bag mouth and corresponding to the flap M remaining on the hanger part.

The legs Ca of cut C diverge upwardly from the cut bottom Cb, across the perforation line L into the part H. The cut bottom Cb, being thus spaced below and parallel to the perforation line crossing the cut legs, has certain important advantages.

By a finger or thumb, or finger nail moved with light pressure downward, in the direction of the arrow in FIG. 20, the cut bottom edge Cb of an exposed bag can be caught and the front layer or wall of the bag easily lifted away from the back wall or layer "r", facilitating tearing a bag from a pad. The recess R in the torn-off bag facilitates opening the bag in like fashion, as a finger is moved into the recess to encounter and lift the cut edge Cb. The tearing off is also easier, since no separation work has to be done at the perforation line portion La, between the cut sides Ca—Ca, for the parts H and B have already been severed at this region by the cut C.

Further, with the cut C fabrication is simplified, since the perforation line L does not have to be made with millimeter-precise location aligned relative to a straight cut already made in the web as in FIG. 1. In FIG. 22, inasmuch as the perforation line crosses the legs Ca—Ca, it may vary somewhat upwardly or downwardly from design-intended placement without impeding or detracting from intended functions. This obviously facilitates manufacture, and especially so when the perforation line L is to be produced after bag sections have been connected into a pad.

When the bag material is thin film, advantageously the severing welding is used, i.e., producing the structures as in FIG. 24 or 21 through a heated wedge jaw; but for thick film, a severing cut is made with a distinct simple seam welding to one side of the cut as for the bags of FIGS. 1 or 13, or on both sides where desirable.

It should be noted that certain of the above bag and pad structures may be used also for side gusseted bags, and in association with certain bag structures disclosed in the earlier filed copending application.

Bags of FIGS. 24–27

The tear-off line may omit the cuts C or Cs, resulting in coincidence of simple perforation lines L through both layers as at L in FIGS. 24, 25, 26. Where bags, hence the sections, are to be gusseted as at gs in FIG. 27, that is, have side infolds, the starting web would be similarly side-infolded.

FIG. 24 shows an individual web section BS, as in FIG. 1, comprised of a bag portion B and a suspension portion H yet integrally joined at the transverse tear-off perforation line L extending across the entire web section width and piercing both layers.

The very bottom edge has the seam Bws, a result of separating the section from a web end by a transverse severing weld, which thermally cuts the section from the web end and also effects a thermoplastic seaming or welding of the two layers along the parted edges of the sections. Hence there is a seam Bws on the edge of the suspension part H of the separated leading section and at Bws on the bag bottom in the following section.

The bottom seam weld Bws may be omitted to leave the bag bottom open as in FIG. 15 and provide a "bottomless" bag part H of the separated leading section and at Bws.

In FIG. 24, which also is an effective front elevational view of a FIG. 25 pad, a residual stacking pin puncture line Nh passes just beneath the pair of symmetrically outwardly located suspension apertures or holes A; and the stack-welding line Sw runs across the entire section width in the suspension part at a location between apertures A and the line L. The stack-weld of course appears on this and any other section configuration only after the section has been incorporated in a pad.

This stack-welding, securing each section to the adjacent section, to form the pad of FIG. 25, is spaced closely parallel to the line L. It is strong enough to enable each separate bag B to be manually torn off from the pad, along the perforations, leaving the suspension parts H still bonded together and retained on the pegs or prongs on which the pad is hung for use. The close parallel spacing between the lines Sw and L allows clean bag separation simply by exerting a manual pull on the bag, since there is little material to be stretched in, hence no substantial stretching in, the region between these lines, so that tearing tension force is more evenly distributed than it is when suspension apertures or stacking pin holes occur between these lines.

In the pad of FIG. 27, another example within the apparatus capability, bags are inverted with the bag bottom seam Bw adjacent the tear-off line; and the bag mouth end has a cutout CO running from the bag margin seamed by bag-top seaming, also designated Bw; the FIG. 23 is a fragmentary vertical longitudinal section through a film tube and an incising device, similar to FIG. 17, as a part of apparatus for effecting the method of FIG. 22;

FIG. 24 is a front elevational view of an individual web section comprising a tear-off bag and hanger part or in effect a front elevation of the pad of FIG. 25;

FIG. 25 is a generally front perspective view, of a bag pad corresponding to FIG. 24;

FIGS. 26-28 are perspective views of other bag pads.

GENERAL DESCRIPTION OF METHOD AND PRODUCTS

The improvement, by the weld-stacking of the present invention, in production of stacked padded thermoplastic film bags, is applicable to various bag designs and pad forms. Weld stacking, that is, for each bag section, separated from a continuous web, a welding of the section to, and as it is stacked on, the preceding section in the stack, is shown and described primarily with relation to, though not limited to, bags for each of which the respective "leaf" or bag section in the pad comprises a bag hanger or suspension portion, in addition to a portion which becomes the bag proper when torn off at the time of use. In this suspension portion is made the weld, at times referred to as the stacking weld, which is carried out in the weld stacking procedure; and each suspension portion has apertures or, in conjunction with the bag shape, forms an aperture with a shoulder, which aligned with like apertures or shoulders of other sections in the pad, affords purchase for pad hanging means, such as pins or a bracket, at the place of use. A perforated tear-off connection of the bag portion to the suspension portion then allows easy manual tear-off of each bag from the pad.

The wide applicability of the weld-stacking concept with various bag and pad configurations, and in various methods for production, and in product bags and pads are considered in greater detail in the parent case; appropriate apparatus for production thereof are hereinafter separately discussed.

The term "stack-welding" as herein used, means thermoplastically bonding or welding a severed web section — as it is added to a stack being built up — to the preceding section in the stack, each section either being, or corresponding to, a respective finished bag; verb, noun and participles being used with analogous meanings.

"Horizontal stacking" as herein used means horizontally shifting successive, severed vertically disposed flat web sections, in a direction perpendicular to the section plane against a preceding section on a growing vertically oriented stack. However, various aspects of the invention, particularly pertaining to apparatus, may be applied for vertical or oblique stacking.

The phrases "line of perforations", "perforation line", and the like are to be understood as meaning the preferred formation of a series of short aligned incisions or cuts alternating with at least equally short uncut portions of the film material, rather than merely round holes.

Unless context dictated otherwise, "flattened film tube", as naming a web from which bags are to be produced, includes not only extruded film tubing flattened to a two layer web, but also similar two-layer webs produced by longitudinally folding over a continuous strip and weld seaming the free edges, or by longitudinally weld-severing a larger flattened tube into two or more smaller flattened tubes, or webs.

For brevity or convenience, using the direction of traveling web advance for reference, the terms "upstream", "up" or "above" and "downstream", "down" or "below" and similar terms of direction, may be used analogically in describing relative orientation or positioning of apparatus components or functional stations.

In general, the same or similar reference legends will be applied to identical or analogous parts among modifications.

Product Bag Structures

Bags of FIG. 1

FIG. 1 represents a pad P, comprised of single bag sections BS, produced from a double-layer web of thermoplastic film, by apparatus as hereinafter described, each section comprising a transverse strip-like top hanger or suspension portion H perforated through both layers at A, A, with hanger holes; a bag portion B, separable from the hanger strip along a tear-off line defined by the transverse line of perforations L, through both the back and front walls or film layers of the section. The line of perforations is carried across the entire width of the back wall, but in the front wall "$f$" runs in from the side edges to the middle region into an aligned locally severing cut Cs, normally a straight line, but distortable as hereinafter described to facilitate bag tear-off. The bottom or top and bottom seam welds Bws or Bw (in this or other figures, which are merely exemplary of possible products of the apparatus disclosure) pertain to the particular method of making the bag. The pad P is produced by stack welding a number of such bag sections, each being stack welded to the preceding section at Sw substantially entirely across the top margin of its hanger strip H.

For use, the pad is suspended on a hanger device or bracket having prongs received in the apertures A, A. The interruption of the perforations L of the tear-off line by the severing cut Cs reduces the tearing work, and also facilitates the tear-off manipulation by one hand; for a slight downward thumb pressure, just below the line Cs on the foremost section of a hanging pad, cocks the front wall material below the cut Cs out away from the back wall. This provides a small but gaping opening for easy downward insertion of the fingers of the same hand, which then exerting a slight forward tug, tears the bag off along the perforations L in the front and back walls, with the mouth of the bag, resulting at the torn line L, then open even as it is grasped in the hand after tear-off.

Bags of FIGS. 13 and 15

In FIG. 13, pad P is merely symbolized by four bags B, depicted with the two film layers of each expanded slightly; and similarly in FIG. 15 the bags are spread, although these would be compactly flattened against each other and more numerous, as indicated in FIG. 1, in an actual product pad.

These products do not require in each severed web section a suspension portion left on the pad when the respective bag is torn off.

The top and bottom ends of these bags have shear cut edges Ec resulting from successive simple transverse severance cuts across a flat tubular web; the bottom in FIG. 13 is closed by a continuous bottom seam weld Bw just above the cut bottom edge, as may be produced by transversely seam welding across the entire web width at about the same time that a preceding section is severed; and the stacking weld Sw along a transverse line secures the bag across its width to the preceding bag. Just beneath the top edge or bag mouth and above weld Sw there appears a transverse series of perforations Nh, representing in exaggeration residual closed-up punctures where the section had been pierced in fabrication by stacking pin elements.

For the particular bag form shown in FIG. 13, the stack weld Sw to the preceding bag, though strong enough to maintain a pad form, advantageously is somewhat weak, corresponding rather to a good adhesion which allows the bag to be stripped cleanly and easily from the pad by hand. The stack weld may be a continuous weld line or a linear series of small weld spots running over the entire width, here and in other bags.

FIG. 15 represents a "bottomless" bag form, lacking the bottom seam weld but otherwise similar to the FIG. 13 bag in structure and manner of incorporation into a pad.

Bags of FIGS. 20-21

In FIGS. 20-21 the web section BS, used for pad forming, is generally similar to FIG. 1 as comprising a top suspension portion H and bag portion proper B, relatively defined by the perforation line L; though in FIG. 20 as in FIG. 13, the top and bottom present cut edges, with a simple welded seam Bw closing the bottom slightly above the cut bottom edge. The stack weld line Sw is displaced upwardly from the perforation line to pass through the hanging apertures A.

Here, in place of the straight cut Cs, made in the front film layer or panel f, in alignment with the perforation line L through both layers, there is used a central downwardly bowed or convex cut C, of a inverted arch shape, a flat bottomed U-shaped incision crossed by the perforation line L. This cut C lies principally in what becomes the top or mouth margin of a bag torn from the pad, as clearly appears in FIG. 21 showing the suspension strip H and the separated bag B, derived from a web section similar to FIG. 20, except for section layer edge-joining by welds Bsw as in FIG. 24 in consequence of a severing weld type separation from the web. FIG. 21 clearly shows a central notch or recess R appearing at the front margin of the torn-off bag mouth and corresponding to the flap M remaining on the hanger part.

The legs Ca of cut C diverge upwardly from the cut bottom Cb, across the perforation line L into the part H. The cut bottom Cb, being thus spaced below and parallel to the perforation line crossing the cut legs, has certain important advantages.

By a finger or thumb, or finger nail moved with light pressure downward, in the direction of the arrow in FIG. 20, the cut bottom edge Cb of an exposed bag can be caught and the front layer or wall of the bag easily lifted away from the back wall or layer "r", facilitating tearing a bag from a pad. The recess R in the torn-off bag facilitates opening the bag in like fashion, as a finger is moved into the recess to encounter and lift the cut edge Cb. The tearing off is also easier, since no separation work has to be done at the perforation line portion La, between the cut sides Ca—Ca, for the parts H and B have already been severed at this region by the cut C.

Further, with the cut C fabrication is simplified, since the perforation line L does not have to be made with millimeter-precise location aligned relative to a straight cut already made in the web as in FIG. 1. In FIG. 22, inasmuch as the perforation line crosses the legs Ca—Ca, it may vary somewhat upwardly or downwardly from design-intended placement without impeding or detracting from intended functions. This obviously facilitates manufacture, and especially so when the perforation line L is to be produced after bag sections have been connected into a pad.

When the bag material is thin film, advantageously the severing welding is used, i.e., producing the structures as in FIG. 24 or 21 through a heated wedge jaw; but for thick film, a severing cut is made with a distinct simple seam welding to one side of the cut as for the bags of FIGS. 1 or 13, or on both sides where desirable.

It should be noted that certain of the above bag and pad structures may be used also for side gusseted bags, and in association with certain bag structures disclosed in the earlier filed copending application.

Bags of FIGS. 24-27

The tear-off line may omit the cuts C or Cs, resulting in coincidence of simple perforation lines L through both layers as at L in FIGS. 24, 25, 26. Where bags, hence the sections, are to be gusseted as at gs in FIG. 27, that is, have side infolds, the starting web would be similarly side-infolded.

FIG. 24 shows an individual web section BS, as in FIG. 1, comprised of a bag portion B and a suspension portion H yet integrally joined at the transverse tear-off perforation line L extending across the entire web section width and piercing both layers.

The very bottom edge has the seam Bws, a result of separating the section from a web end by a transverse severing weld, which thermally cuts the section from the web end and also effects a thermoplastic seaming or welding of the two layers along the parted edges of the sections. Hence there is a seam Bws on the edge of the suspension part H of the separated leading section and at Bws on the bag bottom in the following section.

The bottom seam weld Bws may be omitted to leave the bag bottom open as in FIG. 15 and provide a "bottomless" bag.

In FIG. 24, which also is an effective front elevational view of a FIG. 25 pad, a residual stacking pin puncture line Nh passes just beneath the pair of symmetrically outwardly located suspension apertures or holes A; and the stack-welding line Sw runs across the entire section width in the suspension part at a location between apertures A and the line L. The stack-weld of course appears on this and any other section configuration only after the section has been incorporated in a pad.

This stack-welding, securing each section to the adjacent section to form the pad of FIG. 25, is spaced closely parallel to the line L. It is strong enough to enable each separate bag B to be manually torn off from the pad, along the perforations, leaving the suspension parts H still bonded together and retained on the pegs or prongs on which the pad is hung for use. The close parallel spacing between the lines Sw and L allows clean bag separation simply by exerting a manual pull on the bag, since there is little material to be stretched in, hence no substantial stretching in, the region between these lines, so that tearing tension force is more evenly distributed than it is when suspension apertures or stacking pin holes occur between these lines.

In the pad of FIG. 27, another example within the apparatus capability, bags are inverted with the bag bottom seam Bw adjacent the tear-off line; and the bag mouth end has a cutout CO running from the bag margin seamed by bag top seaming, also designated Bw; the cutout laterally slightly overlapping gusset inner edges gs to afford a bag with carrying or grip loops.

Bag of FIG. 28

In the pad of bags appearing in FIG. 28, each section B, bottom seam welded at Bw and of desired bag length, is stack-welded to the adjacent sections of the pad at the section corner regions at the bag mouth end of the pad, in respective triangular corner hanger portions Hc, each defined by respective oblique tear-off perforation lines Lo and each having a central hanger hole Aw; the stack welding being located at the hole peripheries. With this bag and pad structure the hanger holes can be produced by piercing a respective hole Aw entirely through the stack, with a preferred simultaneous welding at the hole periphery between adjacent thermoplastic film layers, thereby to connect the sections into a pad. The holes then also serve as previously for hanging the pad on hanger bracket pegs, from whch successive bags are easily torn off with separation at each perforation line.

APPARATUS FOR STACKING AND WELDING

Figure 2:
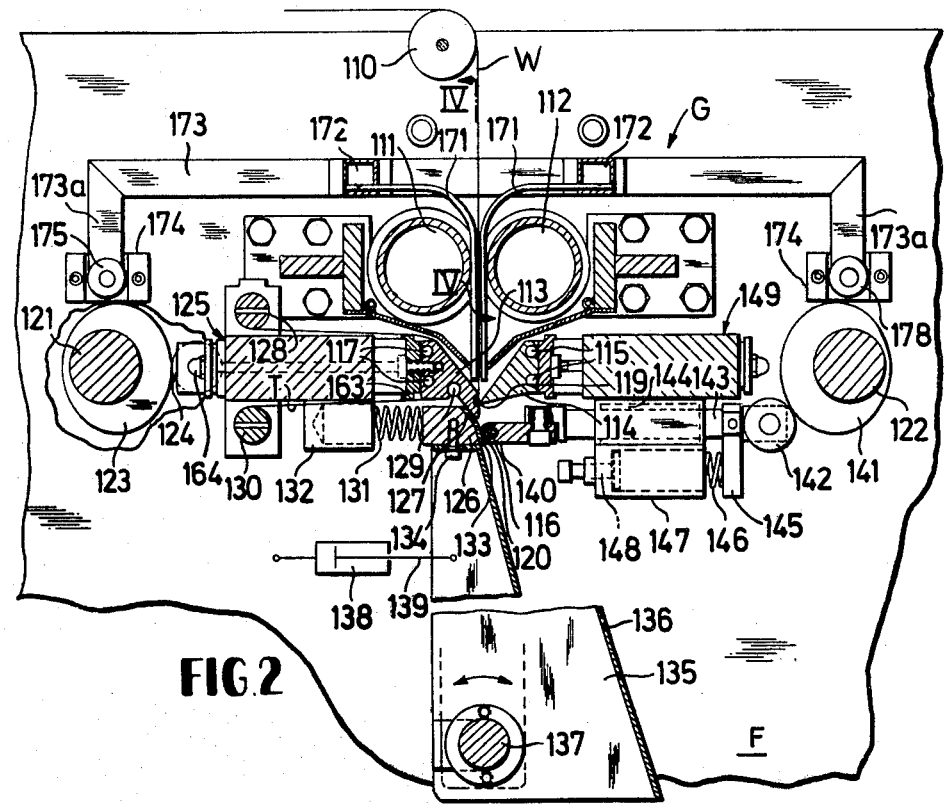
FIG. 2 is a view partially in irregular section of an apparatus for production of a stacked bag pad.
Figure 4:
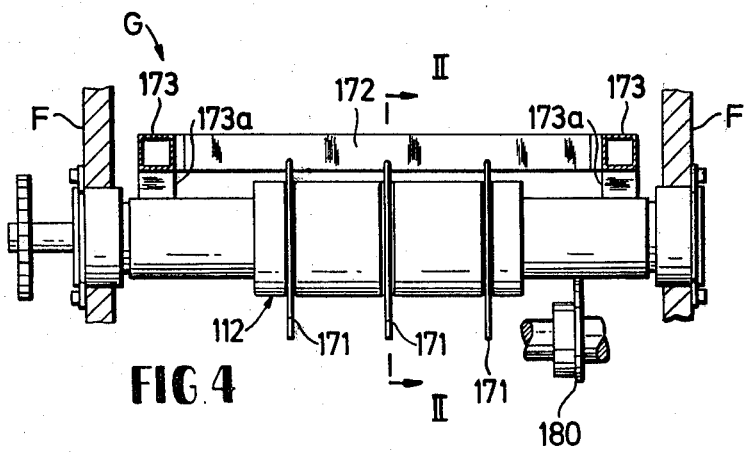
FIG. 4 is a side elevational view of a web advance or feed roll with a guide comb, the view taken generally at the line IV—IV in FIG. 2.

Apparatus FIGS. 2-4

The apparatus shown in FIGS. 2-4 for carrying out the manufacture of horizontally stacked and weld-stacked bag pads, (for example, the pad P in FIG. 1), in general organization best seen in FIG. 2, comprises a main frame fragmentarily represented in various figures by opposed vertical parallel frame plate members F; web feed and advance means or mechanism including a frame-supported and journalled horizontal web guide roll 110, and a pair of cooperating opposed parallel web advance rolls 111, 112 having opposite ends journalled in the frame with axes horizontally coplanar; a web guide and directing mechanism G associated with the advance rolls; a pair of cooperating web welding and severing jaws 113, 114 extending parallel over the width of the web path and operatively horizontally shiftable toward and away from each other and relative to a portion of web W fed vertically therebetween from rolls 111, 112; mechanism for horizontal stacking and stack welding of severed web sections, including a portion of jaw 113; a bag section clamping bar 126 cooperating with the jaw 113 and with a pressure bar 140; a stack support table 135; and a pair of driven parallel cam shafts 121, 122 with ends projecting through and journalled in the frame members for actuating the jaws, and the web guide and stacking systems in timed relation to each other and to incremental web advance by bag section lengths, by virtue of a common power drive not detailed in the drawings.

The rolls 111, 112 advance the web incrementally by an amount corresponding to the length of a bag section or to the width of a bag to be made for bottom seamed or side seamed bags, respectively. The apparatus may include, as indicated at S-1, S-2 in FIG. 11, (merely symbolically and without proportion of size or placement) tooling for carrying out on the web before it reaches guide roller 110 various operations as may be desired and later described.

The jaw 114 is heated by electric rod element pair 115 with jaw 113 normally an unheated counter support member or reaction anvil jaw for 114, but 113 can also be heated by rods 117 and transmit heat from the latter to 114. More clearly seen in FIG. 2a, the jaw 114 tapers to a thus heated narrow web-contacting horizontal longitudinal rib 119 cooperatively opposed by a rubber or elastic insert 120 in a face groove of jaw 113.

The parallel welding bar jaws 113, 114, extending entirely across the web width, are similarly horizontally reciprocably supported and actuated by an arrangement generally symmetrical about the vertical plane of web descent (see FIG. 3) by respective support beams 125 and 149, with opposite ends projecting through slots in frame members F. Each support beam is bushed near its respective ends with bearings 150 for slideable support on two parallel fixed cylindrical slide rods 152; each rod, to serve both beams, being secured at its middle region to the adjacent frame member by a support bracket block 154. By pressure of compression springs 155 interposed on the rods 152 between brackets 154 and the support beams, the latter, and hence the jaws, are biased away from each other.

On the outboard ends of shaft 121, like rotary cam disks 123 engage cam follower rolls 124 on the projecting ends of support beam 125 thereby to move jaw 113 inward against the spring bias force and in turn by spring force to allow jaw recession as the cams recede. Each cam roller is anchored by a slide 160 in a support beam groove to be longitudinally shiftable by a rotational solenoid 161 to carry the follower 124 out of operational alignment with the respective cam. By similar structure, motion is imparted from cam disks on shaft 122 to the support beam 149 and welding jaw bar 114; and the shafts through respective gears or sprockets 156 are simultaneously driven in phase by an appropriate gear or chain drive.

Jaw 113 is connected to its support beam 125 (and with a similar arrangement the jaw 114 to beam 149) by a pair of rods 162 with forward ends passed through the jaw backing plate 163 to thread in jaw 113, the rods extending back through respective bores in beam 125 to adjusting nuts 164 engaging the beam back, whereby the jaw is drawn back against four upright hollow cylindrical metal spacers 166 held vertically captive in broad shallow grooves in the opposed faces of the beam and backing plate.

Though other components to be described are differently associated with the two welding jaws and their support beams, the structure thus far described for the jaw mountings and actuation are identical for each jaw, providing cam shafts with axes in a common plane parallel to each other, to the beams and to the jaw functional surfaces, also affording short spacing from the shafts to the beams and jaws, and identical motions though in opposite sense in the horizontal reciprocation of the jaws, relative to the web path and to each other.

A supply roll 128 and take-up roll 130 (see FIGS. 2-2a) are mounted on the top and bottom sides of support beam 125 for a wide band T of heat resistant sheet material, such as "Teflon". This band passes over the active vertical front face of jaw 113 and its insert 120, back up over the sloping rear clamping face 113x of the dependent longitudinal nose or lip 113n of 113 bearing an electrically heated resistance tape type stack welding element 127 running the length of the jaw back face, to pass around a guide rod 129 in a jaw bottom recess, and thence to roll 130. This band minimizes or prevents the thermoplastic bag material from sticking to or fouling certain heated surfaces.

The bag stacking and stack welding means includes the fore-mentioned stack clamping beam or bar 126 having at least a front face top portion sloped corresponding to the slope on the back clamping face 113x or jaw lip 113n over the length of which 126 extends, and faced with a heat resistant rubber 133; a plurality of bias compression springs 131 supported in recesses of spring housings 132 mounted on the bottom of beam 125 to bear against and urge 126 toward clamping relation with the back clamping face 113x of jaw 113; and a so-called stacking support table 135 pivotally supported in the frame by pivot shaft 137 and supporting the bar 126 secured to its top end by screws 134. A pneumatic or hydraulic cylinder unit 138 is secured to the frame or to a hanger from beam 125 with piston rod 139 connected to the table. Accordingly the bar 126 can move back with jaw 113, and also can be moved away from jaw 113 by action of piston 139 to release a bag stack clamped therebetween as hereinafter explained.

Thus the jaw nose 113n as carrying stack welding element 127, and 126 cooperating therewith, are also stack welding jaws. Appropriate known electric supply and control means (not shown since conventional) are of course provided to energize the stack welding elements as required.

Table unit 135, made of sheet metal formed into a U-shape, as seen in horizontal cross-sections, and upwardly tapering in side elevation, has a sharply sloping nearly vertical rectangular stack support front face 136 preferably with a rubber facing.

The pressure bar 140, coextensive in length with 126, and having a rubber covered front face smaller in height than but sloped correspondingly to the cooperating lower face portion of 126, has a longitudinal air supply passage 116, opening through upwardly forwardly directed outlets or a longitudinal slot nozzle 118.

Bar 140, to move toward and away from 126, is supported at both ends by a respective horizontal slide element 143 slideable in a frame-mounted slideway housing 144 and at its end remote from bar 140 carrying a cam follower roller 142, kept in contact with a respective cam by action of a bias spring 146 in fixed spring housing 147 bearing against side arm 145 of slide 143; the effect of spring 146 being adjustable by screw 148 threaded into the spring housing bottom. The pressure bar 140 may be operated by the cams on shaft 122 actuating the jaw 144 by appropriate placement of the followers and suitable cam contouring, for picking up motion for 140 sequenced relatively to action of jaw 114; or by distinct cams on shaft 122, e.g., cams 141.

The mechanism G includes, associated with each advance roll, a plurality of parallel thin tubes 171 running horizontally out from a hollow supporting cross bar 172 to bend downwardly in parallel vertical spacing, providing respective rake-like structures, each with its set of prong-like verticals accommodated in circumferential grooves of the respective roll (FIGS. 4, 2) to extend down along a corresponding side of the web path into the inter-jaw region.

The cross bars 172 in parallel are connected at opposite ends to long horizontal side members 173, each supported on an adjacent machine frame member F by a slideable engagement of its dependent ends 173a in frame-supported brackets 174; the inverted U-shaped members 173, 173a and cross members thus forming a vertically shiftable support frame for the rake structure and tubes 171 (shown in upmost position) shifted by rotary cam disks 180 (shown only in FIG. 24) engaged by cam follower rollers 175 to cause elements 171 to descend between the jaw working surfaces when retracted and keep web material free therefrom. The cross bars 172 are hollow to serve as pressurized air manifolds for the tubes 171 attached thereto, as part of a air supply system timed for discharge of air through elements 171.

OPERATIONS — FIGS. 2–4

Production of bag pads of the type shown in FIG. 1 is assumed with the horizontal reach of the web W coming to guide roller 110 already provided with appropriate longitudinally spaced patterns of suspension holes A, A, tear-off perforation lines L and the like, so that only severance of a section from the web or severance and bottom seam welding are to be carried out at the jaws.

With advancement of the web for a section length, by the cams the jaws open and bars 126–140 separate; the elements 171 descend, freeing the bottom of the web if adherent to the jaws and discharging air to steady the web and avoid fold formation by providing an air cushion on each side. As soon as the section length feeding advance of the web is completed, with the prongs 171 lifted upwardly, the jaws 113, 114 come together on the web to sever the section, with welding as required, the bar 126 returning from retraction with 113, and the pressure bar 140 moving toward 126 to clamp the top region of the advanced web section for retention upon severance. Further advance of the pressure bar 140, cam effectuated, with the recently advanced bag section still clamped, moves bar 126 backward against springs 131 away from the back clamping face 113x of jaw lip portion 113n. As a sufficient gap between 113n and 126 is developed, air is discharged from manifold passage 116 directed by nozzle 118 at the top of the severed section above the locus of clamping, thereby displacing or inserting the top of the section from the front of 113n into the gap. Thereupon the pressure bar retracts, and 126 under spring bias clamps the inserted top edge of the section against the back surface of 113n. It may be here noted incidently that where section separation perforation lines are provided in the web, the motion of the clamped upper region of the advanced section relative to the web above the then-closed jaws may effect or complete a section separation by a tear-off type action.

Immediately the jaws again separate to repeat the bag section making cycle with a second web advance, the bar 126 again moving back against springs 131 upon shift of jaw 113 with the first severed section yet clamped between 113 and 126, while the second section is fed. Upon jaw closing motion, the second section is clamped by 140 upon the first against 126 in a "horizontally stacked" disposition completed with the displacement of the top region of the second section into the gap, and the return of 126 toward 113n clamping both severed sections therebetween, now with a momentary or impulse heating of element 127 (omitted for the first section cycle since useless) to weld the second section to the first at the top margin, as as Sw in FIG. 1.

Repetition of this complete cycle of bag making and weld-stacking is carried out until a stack of bag sections of desired number has been built up. Thereupon cylinder 138 is actuated to pivot table 135 to the left, hence draw 126 away from 113n; thereby, since pressure bar 140 is not advanced toward 126 at such cycle point, releasing the completed pad to drop away or be otherwise discharged from the mechanism, completing a pad cycle. Thereupon production of another pad of bags is immediately begun.

It is to be noted that basically the same method may be carried out with the jaw 113 fixed and only 114 movable with appropriate apparatus modifications and also with various welding or severing device forms, such as a welding wedge cooperating with a counter-bar or rubber roll as a counter element; that with suitable end guiding of the jaws and support beams, only a single centrally disposed cam can be used for each; and that the web guide mechanism G may be stationary by use of air discharge during the web advance. Also the air need not discharge from the ends of prongs 171, but advantageously also through outlets distributed over the length of each, even with lattice or baffles to direct the air discharge streams parallel to or obliquely downwardly along the web.

APPARATUS MODIFICATION — FIG. 5

Figure 5:
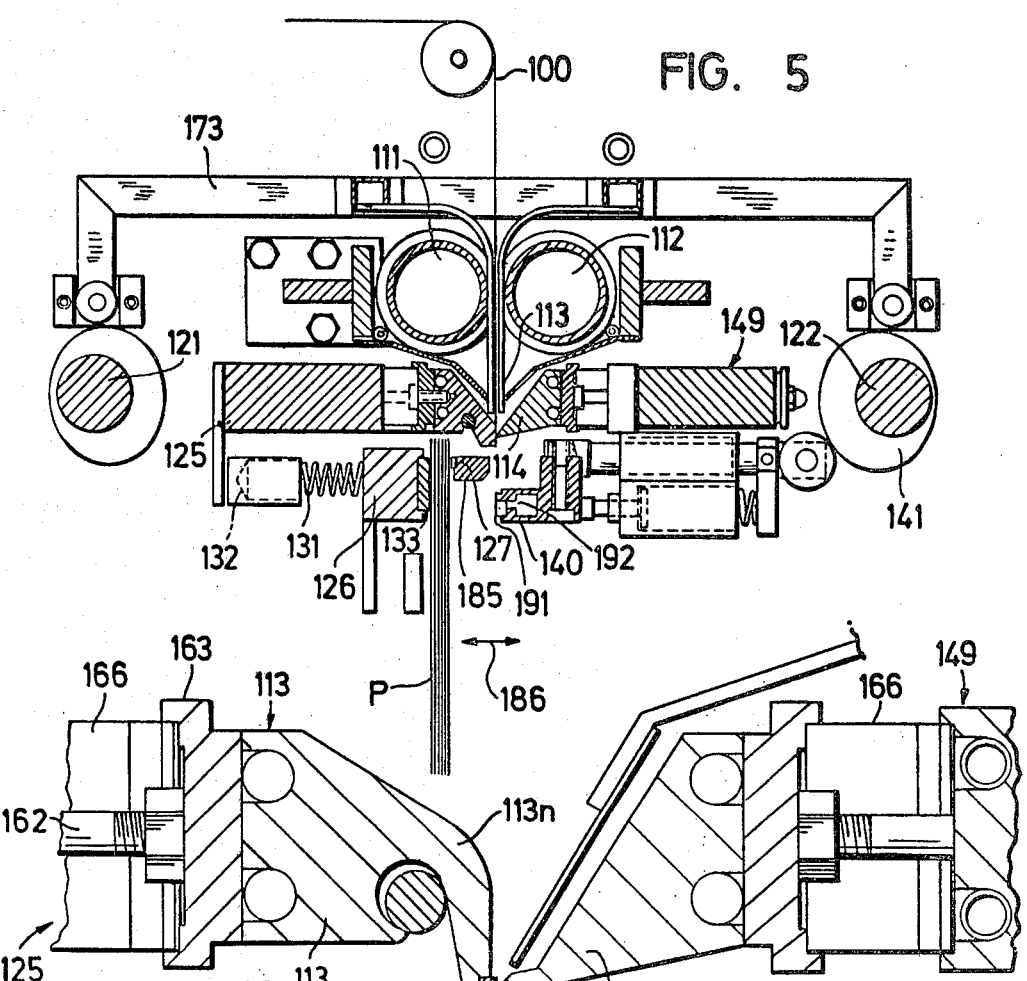
FIG. 5 is a view generally similar to FIG. 2, but showing another form of stacking device.

The aforementioned modification with a stationary jaw 113 is represented by one embodiment in FIG. 5; wherein as generally in this specification like reference numerals designate parts analogous to those previously described. Only the components pertaining to the modification are shown or described in detail. The springs 131 again react against housing means 132 secured to the now fixed support for jaw 113; but the movable clamping surface afforded by 113n in FIG. 2 is here provided by a separate bar 185, carrying the stack welding element 127. Advantageously bar 185 is shiftable in either direction as indicated by arrow 186, and also is independent of the heating of 118.

A simple vertical clamping face on 126 suffices, and the shape of pressure bar 140 is modified to allow it to work in under 185, as is evident from the drawing. The hollow bar preferably serves as a suction manifold with longitudinally distributed suction apertures 192 opening through a web contacting rubber facing 191 as also described for FIG. 6. This modification, as the others, especially FIG. 2, is applicable where several tubes are derived from a single web.

Basic operations here are like those described for FIG. 2. The jaw 114 moves back from 113 for web feed with web guide descent and return, followed by the advance both of jaw 114 for severing and welding and of bar 140 to contact the web and engage it by vacuum application before severance is completed. Thereafter the bar 140 advances further carrying the severed section against 126 and any previous sections there stacked, thereby moving 126 against spring bias away from bar 185, with the latter preferably moving oppositely, to develop a gap receiving the top end of the section when it escapes past 185. To facilitate the escape and the insertion of the section top end into the gap, the rake structure of FIGS. 7–9 may be used. Return of 140 to the right with 126 following brings the stack against 185, (the latter moving back to left if previously shifted to the right); vacuum in 140 is relieved to release the last section; stack welding strip 127 is momentarily energized to stack weld; and with 140 clear of the web path and 114 retracting, the next section is fed to begin a new cycle. Upon completion of a pad, it is released by movement of either 126 or 185 from the other.

Figure 6:
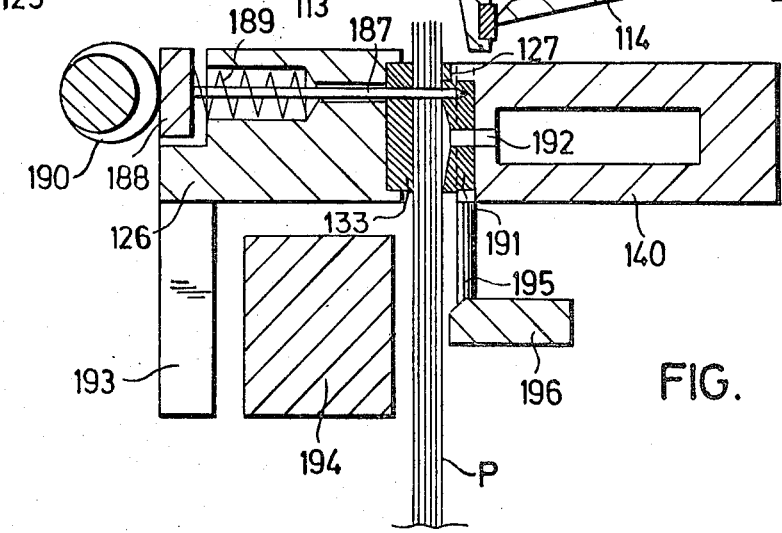
FIG. 6 is an enlarged view showing a modification of the stacking device appearing in FIG. 5.

FIG. 6 Modification

In FIG. 6, a modification of FIG. 5, again the clamping and stack welding operations are independent of a substantially fixed jaw 113. Clamp bar 126, provided with a projecting stop lug 193, engageable with fixed stop bar 194, is bored to accommodate section support needles or pointed pins 187 carried on a bar 188 biased by surrounding compression springs 189 back into engagement with rotary cam or eccentric actuating means 190 mounted on or kept in fixed spacing to bar 126. By progressive rotation of eccentric 190, the pins projecting through the rubber or plastic foam facing 133 are advanced as a stack is built up to keep the points exposed to accept a bag section; the pins supporting bag sections already impaled thereon by action of pressure bar 140.

The bar 126 again is shiftable (with 190 mounted thereon) to the left under spring bias, and the pressure bar 140 is operated, both as previously described.

The working face of bar 140, has recesses for rubber or foamed plastic facing elements 191 which serve as opposing penetratable cushions for pins 187 and through which open the suction inlets 192. Further the face is vertically grooved to accommodate the respective vertical pins 195, and along its top margin carries the stack welding element 127 running across the grooves. The pins 195 project upwardly from a horizontal bar 196, disposed parallel to 126 and 140, and having specific actuating structure as shown and described relative to FIGS. 7–9. This "rake" structure 195–196 is also useful with the structure of FIG. 5.

With this FIG. 6 arrangement, the pressure bar 140, with the rake-like assembly of bar 196 and pins 195 located to the right of the web path at the time of web severance, first vacuum grips the fed web section immediately before it is severed. Then upon severance, with pins 195 still in its grooves, bar 140 moves to the left transferring the newly severed strip under the jaw lip 113n onto the projecting stacking pin tips, and against clamp face 133 (or prior sections) and displacing 126 to the left, until pins 195 are to the left of lip 113n. Then plate 196 moves pins 195 upwardly laying the top margin upwardly and clear of 113n.

After the first bag section, each successive section is thus pressed by bar 140 onto the stack to be welded to the previous section by brief heating of 127. With the vacuum released, and pins 195 retracted, bar 140 moves back to the right with the bar 196. The release of a completed pad is effected by rapid turning of the eccentric 190 to a position allowing pins 187 to retract completely, and this may be aided by suction at 140, or a leftward shift of bar 126 with bar 194 serving as a stripper bar.

Figure 8:
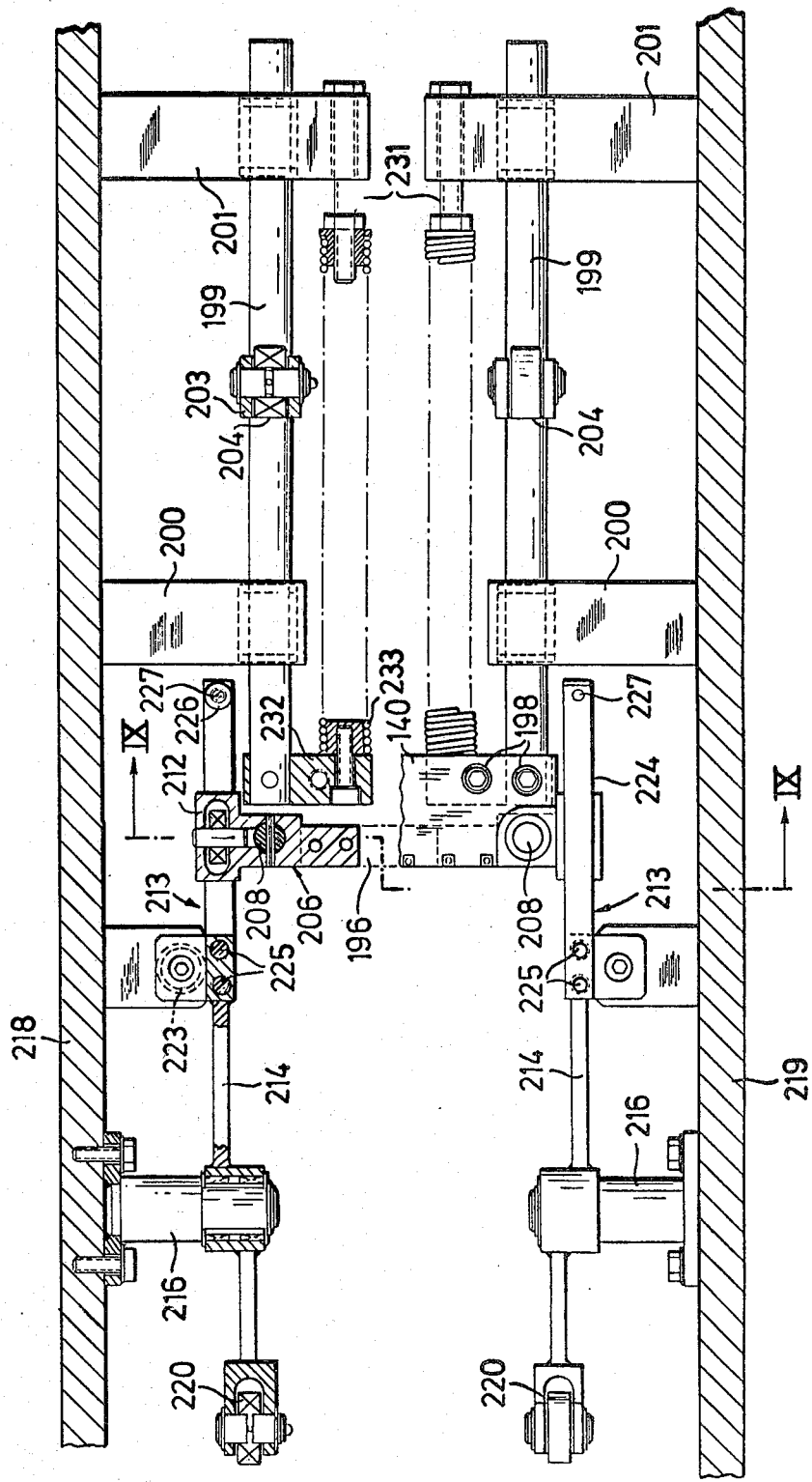
FIG. 8 is a top plan view of the apparatus portion shown as a modification in FIG. 7.

Apparatus Modification — FIGS. 7–9

In FIGS. 7–9, transfer of each severed bag onto the horizontal stack is effected mechanically by means including the rake-like pin and bar structure 195–196 of FIG. 6 without use of the air jets or suction; the stamping bar 140 having grooves 229 running through the vertical extent of its face; and as in FIG. 2, the jaw 113 again is horizontally shiftable and participates in clamping for stacking purposes.

The nose or downwardly extending lip portion 113n has a vertical back clamping face 235, covered with a silicone-glass sheet or fabric, and again provided with the stack welding element 127 described relative to FIG. 2a. The clamping bar 126 associated with the support of jaw 113 and yieldably supported by spring means (not here shown) as in FIG. 2, has a wide rubber faced flat vertical clamping face 236 and, to minimize air pumping effect, a backwardly sloped top.

The general overall action is first noted before detailing the structure. With jaw 114 shifted to the right and jaw 113 shifted to the left and thereby the associated bar 126, as described for FIG. 2, also with the bar 140 and associated rake-structure 195–196 to the right, a web section length is advanced. Immediately the jaws 113, 114 advance to welding severing position, bar 126 returning with 113, and bar 140 preferably leading 114 very slightly to insure engaging and holding the advanced section before severance, somewhat below its top, against the face of 126 or any section precedingly stacked thereon. Upon completion of severance, bar 140 and therewith the rake structure 195–196 advances further to the left pushing bar 126 away from stack clamping relation with jaw lip 113n, and the projecting top margin of the last severed bag folding back over the top of 140 as it passes freely under the lip 113n. The leftward motion of 140 continues until pins 195 are advanced beyond the back face of 113n and thereupon, by bar 196, pins 195 are shifted upwardly into the developed gap between back clamping face of 113n and the clamping face 236 of bar 126 (or any stacked section thickness thereon). The upward shift of pins 195 against the folded margin of the section pushes the margin into the gap progressively flattening it into final stacked position upon the clamping face 236 or the section precedingly stacked thereon. Then upon withdrawal to the right of bar 140 and the pins, bar 126 follows under spring bias as in FIG. 2, until the stacked sections encounter the clamping face 235 which takes over the stack clamping action and by energization of stack weld element 127 welds the top margin of the last section to the preceding stacked section, while pressure bar 140 and rake 195–196 return to the right, for cycle repetition.

As seen more clearly in FIGS. 8 and 9, pressure bar 140 is supported at each end, with intervening space blocks 232, and bolts 198 by respective rods 199, each axially slideable in a spaced pair of bushed brackets 200, 201 mounted on an adjacent frame member 218 or 219, and each having clamped thereon, by a bolt 202, a block 203 carrying a cam follower roller 204 engaged with a respective pressure bar shifting rotary cam 205; the cams being carried on a common shaft such as shaft 122 of FIGS. 2–3. Tension bias springs 233, each having one end anchored to a spacer 232 and the other end secured by a screw type tension adjusting device 231 to a respective bracket 201, bias the bar 140 and slides 199 to the right, away from the web path, hence keeping the follower rollers 204 engaged with the cams; the bar 140 and rake structure being advanced in the direction of arrow 197 only by cam action.

Plate 196 is supported, with its pins 195 vertically shiftably received in respective face slots or grooves 229 on bar 140, bolted to the top of support blocks 206 at each end, which in turn carry short posts or rods 208 vertically slideable in respective bushings 210 in openings at each end of bar 140. The plate 196 in effect is also supported at opposite ends by a roller 212 mounted in the respective support block end and rolling between the legs of a fork-like structure 213 forming a short longitudinal track at the inner end of a lever 214 pivoting on a horizontal pin 216 bolted to the adjacent frame member 218. The outer ends of the levers 214 carry follower rollers 220 urged into engagement with respective rake elevating lever actuating rotary cams 222 on a common shaft such as 121 of FIGS. 2–3, bias tension springs 223, each secured to the adjacent frame member and to the inner arm of the respective lever to urge the latter downwardly.

Each fork or track structure is provided by a pair of parallel plates 224 secured by bolts 225 to the top and bottom sides of and as extensions of a main bar portion of the lever 214; a spacer 226 there secured between the outboard plate ends by bolt 227 also closing the track end.

From the very description of the structure it is evident that with the cams 205 and 222 driven in appropriate timing to each other, to the weld jaw actuation and web feed, the previously described cycle of action is attained.

It is to be noted that the clamping and stacking action and structure of FIGS. 7–9 as well as other forms is useful, even where neither jaw is heated and they serve merely as web holding jaws, or where one of the jaws is equipped with a blade for severing the web sections to be stacked; and so also where there is no stack-welding, but merely stacking, especially with the "rake" structure of FIGS. 7–9.

APPARATUS FIG. 10

Figure 10:
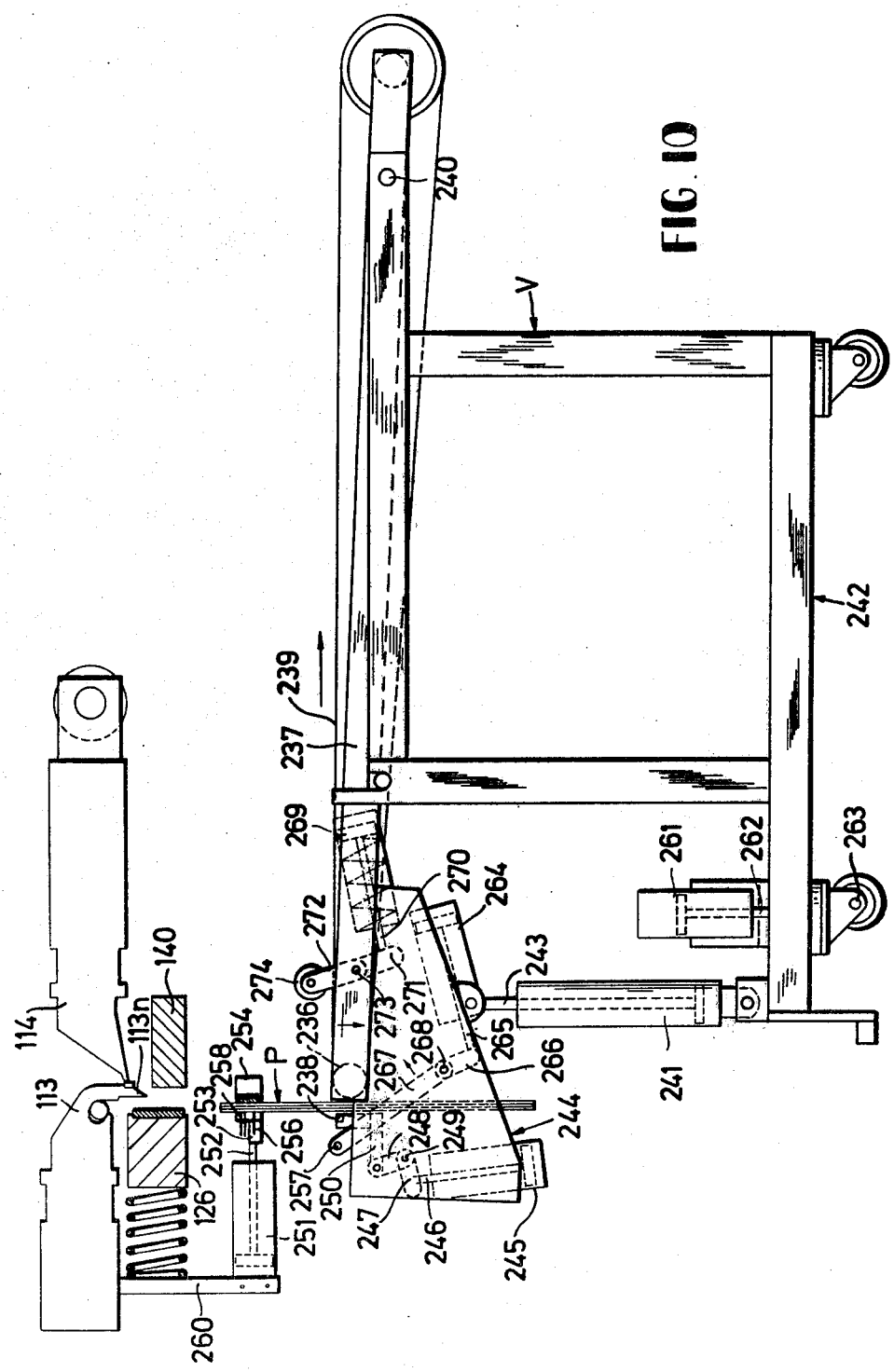
FIG. 10 is a side elevational view, partially schematic, of an arrangement for discharge of finished bag pads, from fabricating apparatus of which certain parts present a modification with certain other parts in outline form.

FIG. 10 presents an addition to the weld stacking structure of previous figures for certain post-severing operations, and also a finished pad discharge table. The welding severing jaws 113, 114, the clamping and pressure bars 126 and 140 are in effect schematically represented, and may take the form described for FIGS. 7–9, preferably with jaw 113 stationary; but may have also the weld-stacking mechanism of other figures. The apparatus is shown in the condition for completion of weld-stacking operations for a pad P already released and dropped from the stacking mechanism, but engaged by subsidiary clamping means to be described.

The pad discharge table comprises a caster wheeled stacking apparatus, including the wheel supported base 242 and a frame V on the upper part of which a horizontal pivot shaft 240 pivotally supports a conveyor belt frame 237 supporting belt 239, intermittently driven to the right in its upper reach by somewhat more than pad length increments. At the left end, the hydraulic or pneumatic cylinder unit 261 anchored to the frame has its piston rod 262 coupled to a vertically shiftable support for wheels 263 whereby the entire frame in effect is pivotal to a degree about the wheels at the opposite end. A skirt-like housing 244 is secured on frame 237, depending from and projecting beyond its left end at a position to enclose the lower end of a descended pad P; and another fluid pressure operated cylinder unit 241 pivoted at one end to base 242 and at its other having piston rod 243 linked to housing 244 serves to pivot the conveyor frame. At the beginning of a cycle or operation the frame 237 is raised.

As the mentioned subsidiary clamping means, a clamp plate 238 is shiftable toward and away from the adjacent end support roller 236 for clamping the pad P by a double-acting cylinder unit 245. The latter, secured to the housing, has piston rod 246, acting on one arm 247 of a rocker arm or knee lever pivoted on shaft 249 in the housing, and its other arm 248 connected to clamp support 250 to shift clamp 238 between clamped and open positions.

A further housing-supported double-acting cylinder unit 264 has its piston rod 265 connected to the lower end 266 of a swinging open frame supported in the housing by horizontal pivot shaft 268. The frame side arms 267 clear the pad clamp mechanism and their upper ends are spanned by a pad-engaging shift rod 257 which, upon extension of cylinder 264, swings against the upper part of a pad clamped by 238, to lay it over the conveyor belt end while the belt is stationary. This action brings the pad top end into position to be held between the belt and a roller 274 mounted between the arms 272 pivotally supported by shaft 273 on opposite sides of the belt.

Roller 274 is raised from the belt by fluid pressure applied in cylinder unit 269 mounted on the far side of frame 237 having piston rod 270 pivotally connected to the lower end of the downward extension 271 of an adjacent arm. The piston is biased toward retraction, hence roller 274 toward the belt by a compression spring within the cylinder. Upon such roller engagement with a pad and release of clamp 238, the pad is retained on the belt until carried off to the right out from under the roller by an increment of belt drive.

For performing operations on a stack-welded pad of bag sections further apparatus is provided, comprising a cylinder 251 mounted by a rigid support 260 on the fixed support of stationary jaw 113; and a perforating or punching type device 253 carried on the end of the piston rod 252, for engaging one side of a stack or pad, and cooperating with an appropriate tooling reaction support or counter blade assembly 254 on the other side of the pad. Device 253 may include, for example, a perforating knife at 256, hole perforating or cutting punches or pins 258, and/or a U-shaped notching knife whereby there may be produced through the entire stack, the tear-off perforation line L, suspension holes A—A, appearing in the various bag figures, and/or the bottom cut-out opening CO appearing in FIG. 27. This is especially useful where it is desired to avoid any operation on a web prior to severing seam welding at the jaws 113, 114.

In typical operation of FIG. 10, as the bag sections are severed and horizontally stacked at 113n, 126, 140 by the operations previously discussed as to other figures, the lower end of the pendant growing stack is disposed in housing 244 between the belt end and the retracted clamp 238 and with the discharge table in uppermost position, i.e., 241 extended and 261 extended.

When the stack P is completed, first it is clamped by actuating and, extending cylinder 245 to close 238; the pad is released by retracting 126; and immediately, by contracting 241, the frame 238 is lowered sufficiently to bring the pad down to the position of FIG. 10, with its upper end between the yet spaced working tool elements 253-254. Then the cylinder 251 is actuated to bring the described tooling into operation and finish the pad P. Immediately the tooling is released, i.e., at least 251 retracted, and preferably also 254, away from the stack path, and the frame 237 is lowered still further to clear the stack top from the inter-tooling space, by contracting cylinder 261; and thereupon cylinder 264 is extended laying the upper half of the pad over onto belt 239.

Descent of roller 274 onto the pad end then occurs, clamp 238 is released and the belt driven sufficiently to carry the bag pad P out beyond roll 274. Then the total cycle is repeated beginning with a web section feed between jaws 113, 114.

The tooling described as associated with the stacking mechanism could also be mounted in the discharge table; and in any case the entire apparatus may be used for stacking bag sections which are not to be stack-welded.

Figure 11:
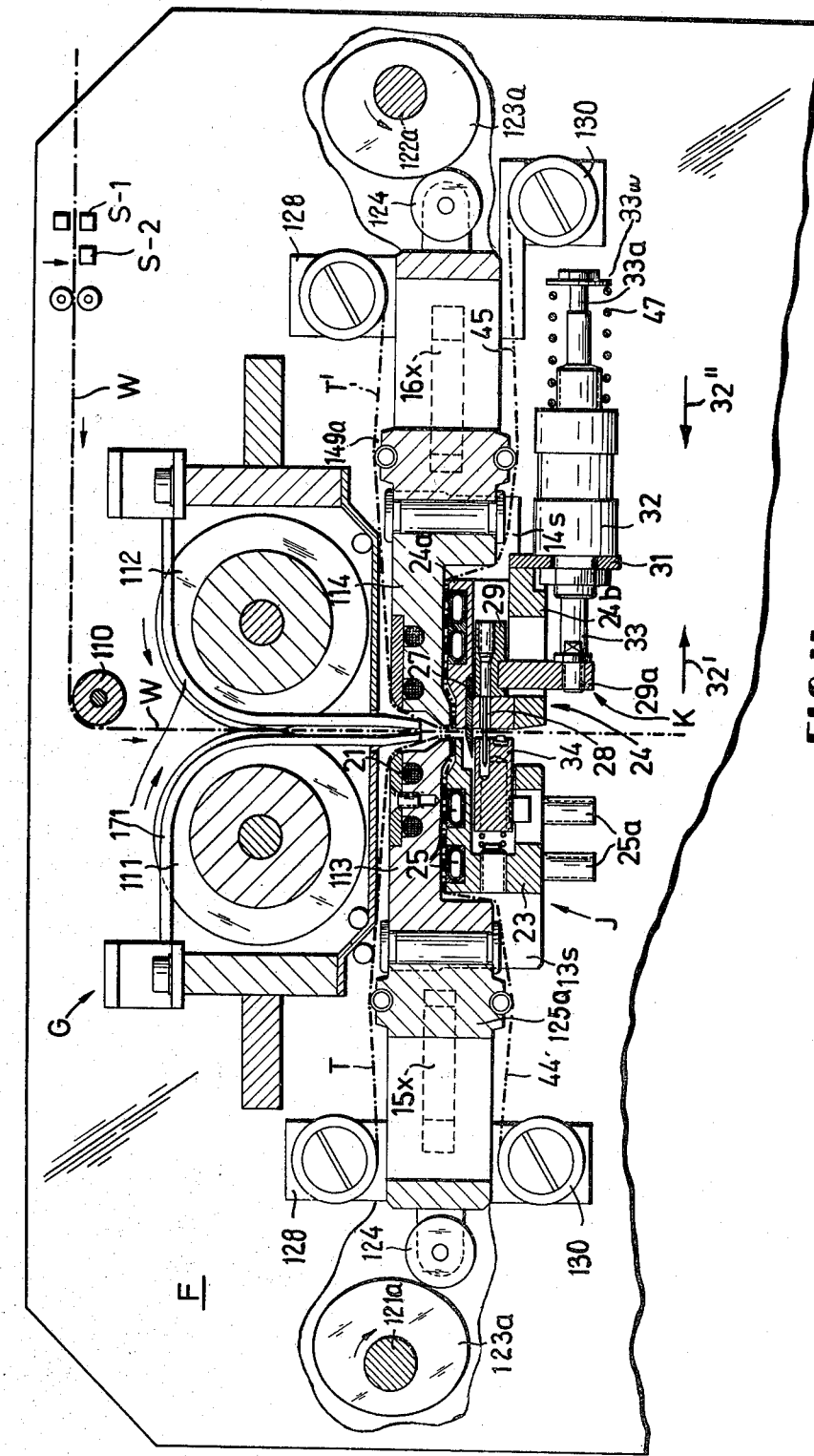
FIG. 11 shows an apparatus modification, which is adapted for both severing and separate welding of web material as well as pad stacking, being a longitudinal vertical section, taken irregularly similarly to FIG. 2.
Figure 12:
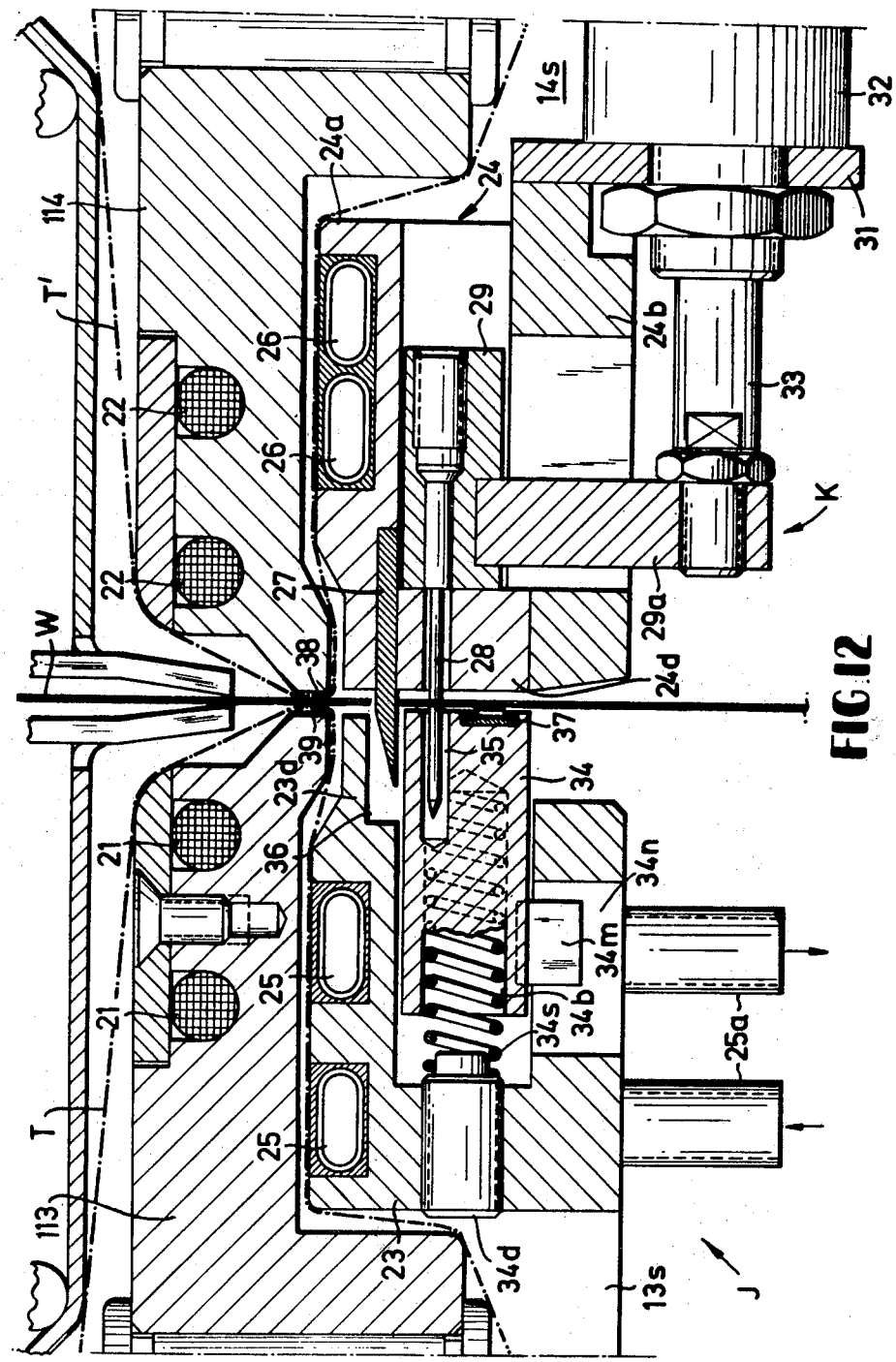
FIG. 12 is an enlarged fragmentary sectional view corresponding to FIG. 11.

Apparatus FIGS. 11 and 12

The apparatus shown in FIGS. 11 and 12, in general organization is similar to that of FIGS. 2-4, in the support by opposed frame plate members F of the web guide roll 110, of the advance rolls 111-112, of the jaw support beams 125a and 149a (similar to 125, 149 in FIG. 2) carrying the cooperating web welding jaws 113, 114, and of the cam shafts 121a and 122a, similar to 121, 122 in carrying cams 123a, 123a acting on cam follower rollers 124, 124 carried by beams 125a and 149a (e.g., on projecting respective beam outboard ends 15x, 16x) to advance 125a and 149a, hence the jaws to close toward each other against the spring opening bias. Likewise these jaw-actuation and web-feed mechanisms are driven in appropriately timed relation as for FIG. 2. However, here the two rake-like arrays of elements 171 in the web end guiding and directing mechanism G associated with the advance rolls, are stationary, thus obviating need for the corresponding operating cams of FIG. 2. Also the assemblies J, K, closely associated with the jaws, include mechanism for knife severing, horizontal stacking and stack welding of severed web sections.

Along the horizontal web reach or path to roll 110, at one or more work stations symbolically indicated by S-1, S-2 in FIG. 11 without signifying any proportions of size nor actual placement at the specific regions used, appropriately timed and driven devices may be used to perform operations on the web such as perforating through both layers, or incising through one layer, or dividing a broad flat tubular film web into a plurality of sub-webs of tubular form longitudinally side seamed on one or both edges. At these symbolized stations there may be used tooling such as that later described relative to FIGS. 17-23.

Though here and in other figures the web is shown feeding downwardly in vertical disposition between the jaws 113-114 and the devices J-K, with horizontal stacking being carried out, it is to be understood that these mechanisms may be disposed to accept a horizontally fed web, with vertical or oblique stacking then used, where the advantages of horizontal stacking are not required.

The welding bar jaws 113 and 114, heated by electric elements 21 and 22 clamped in jaw top grooves by bolted plates, taper to heated narrow horizontal longitudinal flat-faced ribs 39, 38, (see FIG. 12) cooperatively opposed to each other as the effective welding surfaces, extending transversely across the web path. These produce a strong seam weld of the layers over considerable contacting face areas when the jaws fully close on the web, as the cam shafts are simultaneously driven in phase by an appropriate gear or chain drive, to form bottom seam or other welds on successive web increments.

The jaws have respective longitudinal bottom recesses accommodating the cooperating assemblies, J, K, hereinafter described, which are secured to support beams 125a, 149a respectively either directly on forward lateral extensions thereof or mediately through jaws 113, 114.

Here, since both jaws are heated, each support beam similarly mounts a supply top roll 128 and take-up bottom roll 130 for a respective wide "Teflon" band T or T' guided to, over and from the active weld ribs 39-38; the assemblies J, K, having, relative to adjacent jaw recess surfaces, appropriate spacing through which the bands pass. The bottom roll 130 on 149a is displaced to accommodate other components on the right side.

The two aforementioned cooperating assemblies J, K jointly provide web section severing means, stacking means, stack clamping means, and stack welding means. Each comprises an elongated carrier structure or primary body 23 in J, 24 in K, received in the respective jaw recess; the bodies being supported at their ends, at 13s or 14s, by dependent skirts or extensions of, or by anchor plates to, the jaws or carrier beams. To prevent damage by heat emmanating from jaws 113, 114 and to exclude undue heating of other film-contacting parts in this region, especially the knife 27, the tops of the bodies are provided with coolant tubes or passages 25 and 26 having inlet and outlet connections, e.g., nipples at 25a for flexible supply and drain conduiting such as elastomeric hose. This allows a closer placement of parts in this region. With each jaw and the corresponding assembly separably attached to the respective carrier beam, the welding jaws can be omitted or removed where seam welding is not to be done.

In assembly J, a longitudinal slot of body 23, of rectangular cross section and opening toward the web, yieldably accommodates a pressure bar 34 biased outwardly toward bar 24a by helical compression springs 34s, each received in a blind bore 34b with the outer end engaged by an adjusting screw 34d. This bar is retained in body 23 by means such as dependent lugs 34m each received in a respective body aperture 34n, which may also be a lug-embracing guide slot. Among other functions, bar 34 cooperates with the working face on dependent wall portion 24d, in the other assembly, in a pressure bar-clamping bar pair by which to clamp a bag section stack.

In the assembly K, the web severing knife 27 and also (during bag making cycles) the linear series of equispaced pointed web-impaling stacking pins 28 therebeneath, project beyond the face of 24d in the knife support 24. Cooperatively opposite on the other side of the web there is, first, defined between the exposed top surface of 34 and a projecting longitudinal body lip 23d, a longitudinal recess or slot 36 to receive the knife edge 27 and provide a shear counter blade at the edge of bar 34; and, secondly, along the working webward face of 34, a series of small blind bores 35 to accept the stacking pins 38 in die-like fashion.

The close circular edges of holes 35 control the film as a section is impaled; and by preventing tearing and extended wrinkling or other distortion, this permits a stack weld to be made close by, and hence tooling components to be more closely associated. Use of the pressure bar edge as a counter blade to the knife saves space.

So also to simplify and save space for compact construction, the stack welding element 37 is located immediately below the region of the holes 35. This otherwise is similar to 127 of previous figures, being an electrically heated, elongated preferably impulse type, hot wire or strip type element extending over the bar length. It is here mounted on, or as shown inset in, the working face of bar 34, with its web contacting parts projecting beyond the face of bar 34 and cooperating with an opposed face part of 24a, to provide a pair of stack welding jaws. The element is seated in thermal insulation to diminish heat transfer to the bar metal.

A straight heated strip, making contact entirely across a new web section, or an element with a series of longitudinally spaced bosses or contact buttons, may be here used, to effect stack welding of each section as added to the stack on pins 28, respectively either by a continuous straight weld or by a weld taking the form of a series of more or less closely spaced weld spots.

The character of the element 37 or 127 and mode of energization or both are chosen according to the type of tear-off pad to be produced; i.e., whether the tear-off separation occurs at the stack weld as in FIGS. 13 and 15 or along a perforation line as in FIGS. 1, 20–21, 24–27, requiring a stack weld strong enough to retain each suspension portion adherent in the residual pad.

In assembly K for convenience in manufacture and assembly of components, the body 24 is composite, comprising a main member 24a of right angle section providing apertured wall 24d through which the pins extend, and a plate-like bottom part 24b secured thereto defining a slot behind 24d; or as in FIG. 14, where the top part 24a' is separate from the portion 24d' drilled with pin apertures.

The severing knife blade 27, extending over the entire web path width and projecting from the working face of 24a toward the web is secured in a corresponding body slot; and for this also the FIG. 14 type composite is useful, wherein the knife-mounting and clamping slot is defined between a longitudinally rabbetted recess in 24a' and the element 24d'. Thus advantageously the knife and the stacking mechanism are in the same assembly.

The pins 28 are carried by a pin support bar 29 shiftable parallel to the blade and to the direction of jaw reciprocation. For operation, i.e., pin advance and retraction, a bracket plate 31 depending from bottom 24b, mounts the cylinder part of a double-ended, preferably pneumatic cylinder unit 32, the leftward projecting piston rod 33 of which is secured to anchor lug or bar 29a projecting downwardly from 29 through a respective slot of 24b. About the rearwardly extending piston rod part 33a, a biasing helical compression spring 47 is interposed between the cylinder end and a washer 33w nut-secured on 33a.

Thus spring 47 biases the piston rod, hence bar 29 and pins 28, in direction 32' toward a retracted position when 32 is not pressurized; and upon pressurization, bar 29 advances in direction 32'' until it engages 24a, thereby extending the pins 28 to the position shown to accept successive, severed web sections impaled thereon by relative motion between assemblies J, K. Preferably as an easier mode of shifting the bar without canting a plurality of such cylinder-spring assemblies is used, rather than a single central unit.

Thus unit 32 is kept pressurized and the pins extended for stacking during successive web-severing, bag making cycles, until a desired pad is built up. Upon completion of the pad stacking cycle, the jaws 113–114 can be controlled momentarily to remain retracted, thus leaving the clamping function released; and the pressure in the unit 32 is released causing pin retraction into 24, to strip the pad therefrom for discharge.

Unit 32 can also be double acting, i.e., shifting the piston rod, hence, pins, in respective directions by pressure selectively applied at opposite cylinder ends; the spring 47 then being omissible, or if used, aiding rapid retraction for pad release. However, the bias spring arrangement with a single acting cylinder simplifies controls and pressure piping. Appropriate conventional pressuring fluid lines and timing controls are provided for the operation intended.

Here, as the reciprocated jaws 113–114 with assemblies J-K approach each other, closing on each successively fed and halted web increment, the pins and support bar 24 first engage the web to pierce and start it onto the pins; then the knife encounters the web and, against 23, or more precisely bar 34 carried by 23, severs the section from the web end. With continuing approach, the section is carried further onto the pins, by 34 or 23 as the pressure bar, toward the clamping face of 24 as a stop, and against whatever stack portion has already been built up on the pins, to the last-applied section of which the oncoming new section is then stack welded by 37.

The further approach of the carrier then brings the welding surfaces 39-38 together in opposed welding contact with the web, to make a weld such as a bag bottom seam weld at the cut end of the web about to be fed as the next increment; but with the jaw heaters shut-off for making open bottom sections, this is a functionless web contact.

The resilient yieldability of bar 34 against its springs on the one hand, and on the other hand the extent of blade and pin projection as receivable by the opposed receiving recesses on the other, accommodate the increasing thickness of a pad being built-up, and enable this mode of operation in the successive bag section making cycles.

After the pad cycle is completed, and the pad released to drop downwardly to another station for further operations or other discharge, the pins 28 again are extended, and the next web increment fed to begin the first bag making cycle of the next pad cycle. Various operations may be then carried out on the released pad as for the different products shown, such as perforating the entire pad with perforation lines or hanger apertures.

The pin retraction can be effected instantaneously upon completion of addition and welding of the last section in the stack, so that upon start of a next following, relative recession of the carriers 125a, 149a, hence upon a slight shift of bar 34 or slight opening relative to the face of 24 as a clamping bar, the pad is immediately dropped. Or just before the pad-stripping pin retraction, the pad may be unclamped by a relative retraction of bar 34, by the normal recession of carriers 125a, 149a, hence of assemblies J-K, from each other with or without momentary interruption of the common drive of these reciprocating parts, or by a retraction force applied specifically to 34.

Thus with the components of apparatus as shown in FIGS. 11-12 and above described, and no further operations on the plastic film, there may be produced sections severed from the web and the pad resulting from stacking, of the type shown in FIG. 13, when the seaming weld jaws 113-114 are heated; and with the heating turned off, products of the type appearing in FIG. 15 may be made; in both cases the web section corresponding to each bag torn from the pad has a length equal to the bag length.

Moreover, the pads may be subsequently perforated entirely through with hanger hole apertures, at or above the transverse line locus of the stacking pin punctures Nh in these product figures, and also just below the stack weld line, with a line of tear-off perforation, thereby defining a top suspension portion for the entire pad (and hence in the individual sections) including hanger apertures A, and bag portions of corresponding lengths shorter than the originally severed sections. Also, the knife 27 may be omitted in FIGS. 11-12, and the severing-welding jaws of FIG. 16 may be used to make a bag and pad of the FIG. 13 type, but with the edges seamed by the heat severance of each section, as well as to produce the specific bag and section form of FIGS. 24-25.

Moreover, by placement of web incising tooling, such as that device shown in and described relative to FIG. 23, along the web path "upstream" of, i.e., prior to the web advance rolls 111-112 say at the station position indicated symbolically by S-1, there may be fabricated the further variation in the tear-off bag section of FIGS. 20-21 and the resulting pad.

If the web is to be longitudinally sub-divided to produce plural small webs fed side-by-side to the severing and stacking devices, at say section S-2, appropriate tooling may be provided for continuously longitudinally thermoplastically severing-seaming the supplied wide web. With the described tooling used at both stations, the apparatus of FIGS. 11-12 may be used to carry out the method of FIG. 22 and produce pads with tear-off bag sections of the types of FIGS. 20 and 21 depending upon the type of bag bottom seam desired with the option above described for the web severing.

APPARATUS MODIFICATION — FIG. 14

FIG. 14 shows an apparatus modification with simplification of the reciprocating parts, suitable where only a web severance is required without bag bottom welding, e.g., for bottomless bags as in FIG. 15.

Since bottom seam welding is not desired, the welding jaws and the Teflon band system are omitted. Simpler support beams 125A and 149A are used, since required to carry merely the cooperating assemblies J' and K' for accomplishing the severing, stacking and stack-welding functions.

Apart from the modification to be described, since the rest of the apparatus is similar to that described for prior figures, other parts are not shown except for the web advance rolls 111, 112 merely outlined only to provide a location reference basis for the described modification.

In assembly J', the carrier body 23A serves as the pressure bar. It has a simple rectangular section, with working face first longitudinally slotted at 36A to afford the cooperating recess and blade counter edge for knife 27, and secondly provided with the series of blind bores 35 to accept the tips of pins 28. The body 23A itself carries the electrically heated stack welding strip 37; and is resiliently yieldably mounted to carrier 125A, or 24a' may be so mounted, as the simplest way of accommodating a growing stack thickness. This arrangement conduces to compact construction with elimination of a special pressure bar. The character of strip 37 and its mode of operation are as shown and noted for FIG. 11 depending upon whether the tear-off pad form of FIGS. 15 or 20 be used for bottomless bags.

In the assembly K', again body 24A is composite, comprised of a top part 24a', a bottom part 24b', and disposed therebetween at the web face, a bar 24d' apertured for the pins 28. These elements secured together define, behind 24d', the slot in which the stacking pin support bar 29A is slideable fore and aft to advance and retract pins. The element 24a' has a cross-section which is a narrow rectangle; and has a broad shallow rabbet-like recess to accommodate the thickness of blade 27 clamped therein. The bar 24d' provides the major working face area of 24A and extending over the length of and the greater part of the width of the recess, defines a slot for, and may therein clamp, the knife 27.

The cylinder part of pin actuation cylinder unit 32A (or a symmetrically disposed plurality of such units) is anchored through a plate 31A to a back extension of 24b'. The piston rod 33A here connects directly to or engages the back of bar 29A, since space is available to locate unit 32A with axis at the centerplane of 29A, because of the omission of other components, used in the FIG. 11 form at the region.

With a spring and cylinder arrangement as in FIG. 11, a single-acting unit is used at 32A; but without retraction spring means, the double-acting unit would be required.

In operation, the section severing, stacking and stack-welding to form a unitary pad proceed basically as described for FIG. 11.

When the last bag section has been added to the pad, and the carriers with J' and K' have receded, the drive for one or both may be momentarily interrupted, leaving the finished pad unclamped, and then the pins are retracted, freeing the pad for downward discharge.

The close spacing achievable between the cut edge Ec and the stack weld location Sw, with the pin engagement location therebetween, as represented by the in fact closed-up stacking pin holes Nh, is apparent from FIG. 15.

Other preliminary operations on the web or subsequent operations on the pad may be carried out to produce pad forms and tear off designs as in other figures, but in bottomless bags.

Figure 16:
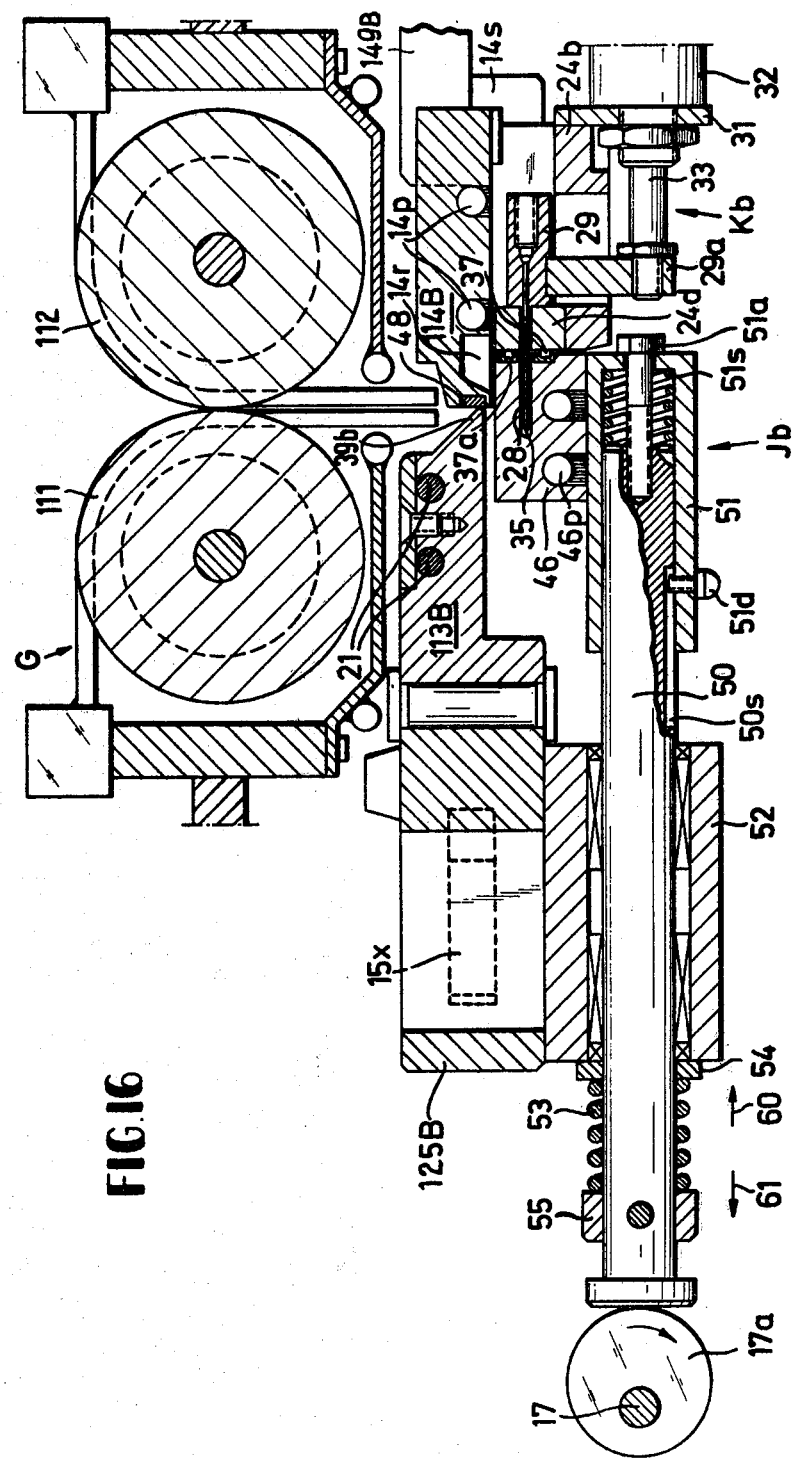
FIG. 16 is a fragmentary vertical section through a still further apparatus modification.

FIG. 16 Apparatus Modification

Fragmentary FIG. 16 shows the machine parts particularly affected by another apparatus modification, capable of producing bags and bag pads with bag bottom seams, such as those described for FIGS. 24 and 25.

The welding bar jaw 113B, heated by elements 21 and having a wedge-shaped operative welding edge 39b, is cooperatively opposed by a heat-resistant elastomeric welding anvil or counter strip 48, inset in the jaw 114B for carrying out severing seam welding, which heat severs the webs transversely and simultaneously thermoplastically joins or welds the film layers on each severed edge. Hence the severing blade of FIGS. 11 or 14 is omitted.

The jaw 114B advantageously has coolant passages 14p, and similar passages 46p are provided in the pressure bar 46 in its lower region which serves to clamp bag section stack below the part wherein stack welds occur. This cooling prevents interference with stacking by heat from jaw 113B and stack welding elements 37—37a overheating the stack clamping area especially below the stack welding region. For like reason the stack welding band here and in other figures is seated on insulation interposed between it and the support metal.

In the cooperating stacking, stack welding and clamping assemblies Jb and Kb, for Kb the cooled jaw 114B may serve as the major body component affording a top wall for the recess or slot receiving the shiftable pin carrier 29; the latter being actuated through extension 29a, and piston rod 33 of a cylinder unit 32, supported by bracket plate 31 as in FIG. 11 to advance and retract the stacking pins 28 through the working face wall of 24d. The clamping face of 24d is thus offset behind the anvil welding jaw edge of 114B, which has a longitudinal bottom recess 14r to accommodate upwardly projecting margins of web sections moved past the anvil face onto pins 28.

The pressure bar 46 is shiftably secured on the respective ends of rods, such as rod 50, through a socket barrel 51 slideably retained on the rod end by a bolt 51a against the bias force of helical spring 51s acting between the socket and rod end, the socket preferably having therethrough, and being guided by, a screw 51d engaged in a short longitudinal rod slot 50s.

The working face of pressure bar 46 here also has a series of blind bores 35 as die holes accepting the pin ends as previously described; and immediately thereneath, the inset, preferably impulse type or momentarily electrically heated, stack welding strip 37. Above the hole series, the second like strip 37a may be used, so that electively stack welding can be carried out above and below the pins or at either place.

The face portion of pressure bar 46, especially beneath strip 37, cooperates with an opposed stack clamping surface provided in the other assembly by aligned edges of bottom plate 24b and wall portion 24d.

Here the pin support bar 29 in addition to being retractable fully to strip a finished pad, preferably is cyclically slightly retractable through the pneumatic cylinder to clear the pins 28 from the web path for each web feed. The welding jaw bar 114B and the clamping bar 24b can both be stationary; though with the carrier 149B reciprocated, the cylinder and spring arrangement can be used as in FIG. 11.

Jaw 113B is itself supported by carrier beam 125B slideably supported in the frame to close against spring bias as described for other figures. A preferred plurality of the rods 50 are each slideable in a respective slide bushing 52 mounted on carrier 125B. An eccentric cam 17a secured on drive shaft 17 bears against the outer free rod end. Each rod carries a helical compression spring 53 interposed between a ring 55 secured on the rod and the support 54, such as a seat washer bearing against bushing 52. The compression spring means thus afforded biases the carrier of jaw 113B toward the barrel 51 as a stop for bushing 52, or conversely the rod 50 is biased with bar 46 toward an engagement of barrel 51 on the bushing. The strength or rates of the springs 53 are chosen stronger than the jaw opening bias springs for carrier 125B for the manner of actuation subsequently discussed.

Considering the jaw closed position shown as a bag cycle starting point, as the cam 17a rotates and recedes, the compressed spring 53 urges rod 50, hence bar 46, in direction 61 to the left until barrel 51 engages 52 as a stop, bar 46 being then under jaw 113B. Thereafter as the cam eccentric 17a recedes further, the jaw-opening bias springs become effective to move carrier 125B and jaw 113B along with rod 50 to retract 113B out of the way for a web feed increment.

As the rotating cam then drives the rod in direction 60 to the right, the pressure bar and the jaw edge 39b encounter the web to impale and, with a welding severance, sever the fed section. The rod 50 can continue moving to the right, though carrier 125B is stopped, by compressing spring 53; so that the bar 46 moves the severed section completely onto the stacking pins. Then the selected impulse welding strip is energized for instantaneous heating to effect the stack welding of the new section, and the bag cycle repeats. The yieldable mounting of the pressure bar 46 again accommodates the increasing thickness of a stack being built up.

The resilient lost motion connection thus provided with rod 50 enables the jaw carrier 125B, accordingly the jaw 113B, to reciprocate along with rod 50 over a portion of its stroke; during part of which bar 46 is retracted in effect behind the welding edge 39b, i.e., back under jaw 113B.

Thus for each bag making cycle, the stacking mechanism drive is obtained from the welding jaw drive.

However, the described actuation of jaw 113B may also be used, when jaw 114B has timed reciprocation by a slideable mounting of its carrier 149B and cam actuation as in FIG. 3.

The mode of stacking operation is thus basically similar to that described for previous figures; that is, in each bag cycle after a web increment is fed past the open, parted jaws and stacking device, the advancing pressure bar impales the web on the pins and also severance of the fed increment is effected.

When a pad cycle has been completed, that is, the desired stack has been built up, the pins are retracted completely into the bar 24d, and clamping action on the pad, between 46 and 24d, released, for pad discharge as previously described for other figures, and for subsequent operations as may be required for the desired product, for example, punching through the pad a tear-off perforation line below the pin holes made by stacking pins 28, and below stack weld line Sw.

The bag sections and pads of FIGS. 24–25 may be thus made, so also the bag section of FIG. 21, with further tooling of FIG. 23 and the method of FIG. 22 as described for these figures as well as for FIG. 11.

It may be noted that where this film-impaling stacking pin type mechanism is used for a vertical or oblique stacking, the pin support and cooperating members previously described are so arranged that the pins project upwardly to receive the web sections impaled thereon, and then for release of the stack are retracted downwardly.

Figure 18:
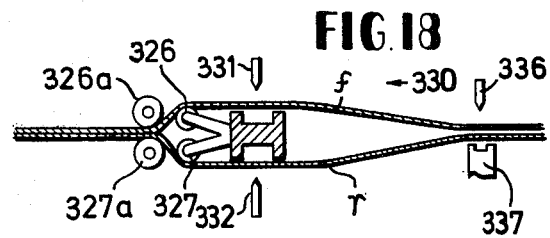
FIG. 18 is a vertical section similar to and showing an addition to FIG. 17.
Figure 19:
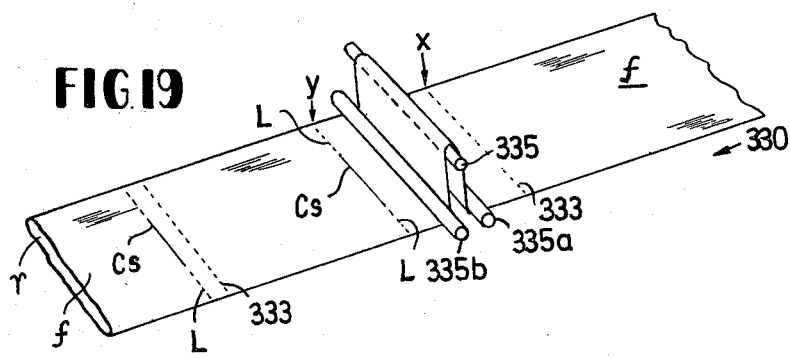
FIG. 19 is a perspective quasi-schematic view of an apparatus tooling variation, useful for production of a bag such as that of FIG. 1, for example.

FIGS. 17, 18 and 19

As previously noted in the discussion of apparatus operation for FIGS. 2–4, for production of the FIG. 1 (or FIG. 26) type bag and pad, also in operations where each web section representing a bag portion and suspension portion is to be separated from the web by a section tear-off action in the apparatus, the horizontal web reach W arriving at guide roller 110 is already provided, for example, with appropriate longitudinally spaced patterns of bag tear-off perforation lines, and where appropriate, web section separation perforation lines and associated bottom seam welds, made at prior work stations along the web path. Thus devices such as the perforators of FIGS. 17 or 19 may be mounted in the machine frame along a horizontal reach or path of the web; e.g., to the left of roller 110 in FIG. 2, or as suggested by symbolized stations S-1, S-2 in FIG. 11.

FIG. 17 shows a composite device or apparatus sub-assembly for producing the tear-off line, as comprised first of an elongated horizontal bar 325, which, by correspondingly elongated internal support rollers 325—326 on bifurcated bar outrigger arms 328, is floatingly supported and rides within and extending across the width of the web, just in front of the opposed external support rollers 326a, 327a, which are mounted in the machine frame, and between which the web advances. Substantially identical structure appears also in FIG. 23. The bar 325 has an appropriate form and cross section with recesses or the like to serve as a counter blade or reaction member for the upper and lower blade elements 331, 332. Blade 331 is a combined perforating-severing knife adapted to make the perforation lines L and the severing cuts Cs in the top layer f; while blade 332 is a simple perforating blade to produce the perforation line L in the lower layer L; and both preferably also carry punch formations to produce the holes A, A.

FIG. 18, again more or less schematically, shows apparatus or tooling for making the tear-off line L-Cs by means identical to that shown in and described for FIG. 17, with which there is associated a simple perforation incising knife or blade 336 above the web in opposition to an appropriate cooperating counter-blade or element 337 below the web, for making a perforated separation line, e.g., such as 333 in FIG. 19 when it is desired to carry out transverse seaming by an operation which does not also sever the web, and without use of specific severing blade such as 27 in FIGS. 11 and 14.

Where the web separation line 333 is not made in the same work station conjointly with the tear-off line L-Cs, it becomes possible to locate the tooling therefor at respective stations, designated "X" and "Y" in FIG. 19, spaced in convenient locations, fixed if desired, along the web path, by use of the intervening guide roller arrangement of FIG. 19.

The web is carried over or trained about guide rollers 335a–335b, fixed parallel to the web and to each other above the web path, and over a superior third parallel roller 335 vertically selectable in spacing above the other two, so that by vertical adjustment of 335, the web length between stations X and Y is changeable, and accordingly the spacing at which the tear-off line L-Cs is made in front of a respective line 333 can be readily and precisely varied, without tool shifting and quite independently of the tooling spacing.

FIG. 22 and FIG. 23

FIG. 22 shows a method of making tear-off bags by producing bag sections BS three at a time, simultaneously building three pad stacks, using the herein disclosed apparatus.

A single continuous broad web W is, as it is advanced say to roller 110, in effect continuously converted into three narrower sub-webs; and repeatedly from the web leading ends, three sections are simultaneously separated by a transverse severance, and then stacked side-by-side by the described forms of apparatus with the operational variations otherwise available as previously described.

Moreover, these figures show the fabrication of the FIGS. 20–21 type bags. On a first or "upstream" station along the web, e.g., at S-1 in FIG. 11, or a corresponding location in FIG. 6, simultaneously the three incisions C are made abreast in the top film layer "f" appropriately spaced across the web to fall at respective centers of the three equi-width "sub-webs" to be subsequently produced. A cutting device such as that of FIG. 23 is used, basically identical to that of FIG. 17 in all the like numbered parts, excepting that the stamp-like blade 331a does not perforate, but has only C-shaped incising edges cooperating with corresponding die-like recesses at 325r in the "floating" anvil or bar 325a.

At a second station "downstream" from the first, the web is longitudinally severed, along lines 424–425 midway between adjacent incisions C, and edge-welded along each severance line by known appropriate tooling; then at a further station as at the described working jaws, the leading ends of the three "sub-webs" are simultaneously transversely severed along the line 426 into three respective bag sections.

Preferably subsequently, the tear-off perforation line L through both film layers is made transversely across the wider web, or the sub-webs, and running across the incisions C. Or the perforating may be done in pads resulting from stacking and joining the sections at the suspension portions; whether that joining be done after the stack is made, or by stack welding each bag over the entire width. Hanger hole perforations may be made in the same or by a separate operation.

However, making of incisions C, by a FIG. 23 device, may be immediately followed by the production of the perforation line L through both layers, by tooling such as 336–337 of FIG. 18; say with the FIG. 23 cutter used at station S-1, and 336–337 then used at S-2.

An inverted arched-shape incision form is preferred; either arcuate or, better, of inverted flat-bottomed, broad U-shape as shown. For these the spacing of the severing line 426 behind the incisions C principally determines in the sections the height, size of the suspension portion H, though the occurrence through C of a preferably subsequently made perforation line is precisely determinative of this dimension.

The inverted arch incision, resulting in the tear-off line form of FIGS. 20–21, is preferred to the straight incisions Cs which require to be aligned with the perforation line; for the perforation line needs merely intersect the side limbs, i.e., the divergent side legs Ca—Ca, of the incision C. This is easily accomplished with a perforation line L running entirely across the incision, with no register problem as could occur with a straight cut Cs, while yet affording an adequate spacing to produce, below the perforation line, the recess R in each section of FIGS. 20–21 useful for ease of bag tear-off and subsequent opening. Small variations in the relative placement of the perforation line are not objectable, and in this sense then the spacing of the severance from the incision C is essentially determinative of the suspension portion height dimension.

Though the transverse web severance may be made by a severing seam welding, alternatively the section severance may be done by a severance cut, and then making a transverse seam weld to one side of the cut for the bag bottom or even to both sides.

FIG. 28 Bag Pad Method

Apparatus of the aforegoing types is useable in a method where stack welding is not carried out as each section is added to the stack, but rather the sections, (e.g., bottom seamed sections in length equal to the length desired for seamed bottom bags seamed at Bw as in FIG. 28) are stacked horizontally or vertically to the desired pad quantity; then oblique tear-off perforation lines Lo are punched simultaneously through the complete stack across the bag corner regions at the bag mouth end of the stack, defining two triangular hanger portions Hc; and finally, centrally in each perforation-bounded corner region hanger holes are produced by piercing a respective hole Aw entirely through the stack, with preferred simultaneous welding at the hole periphery between adjacent thermoplastic film layers, thereby to connect the sections into a pad. The holes then also serve as previously for hanging the pad on hanger bracket pegs, from which successive bags are easily turn off with separation at each perforation line.

I claim:

1. Apparatus for manufacture, from thermoplastic synthetic plastic film in the form of a longitudinally advanced continuous two-layer web, of bags such as carrying bags or the like packaging, stacked and connected with one another through welding into a tear-off type pad, comprising:

cooperating opposed jaws on opposite sides of a web path with at least one jaw reciprocatingly movable relative to the other in a plane perpendicular to the web advancing in said path, the jaws operating on the web to produce a bag and including a web severing device to separate it from the web, and a bag stacking and padding device located, in the direction of web motion, immediately beyond the severing device, said stacking device including a reciprocating padding welding device for welding each of the successively produced bags to the preceding bag as each is added to a bag stack being formed;

the said severing device and said padding welding device moving in parallel planes.

2. Apparatus as described in claim 1, wherein said jaws are disposed on opposite sides of the path of a vertically descending web, and said plane is horizontal.

3. Apparatus as described in claim 1, wherein at least one said jaw element is actuated by cam means operating against spring pressure applied to the last said jaw.

4. Apparatus as described in claim 3, wherein both said jaws are actuated by cam means, said cam means comprising rotary cams supported on respective drive shafts extending parallel to the said jaws and substantially in the plane of movement thereof, both said jaws being supported by respective support beams both movable against opposing spring pressure.

5. Apparatus as described in claim 4, wherein one jaw has a downwardly projecting lip providing a front welding face, and a back clamping face;

said apparatus including a clamping bar cooperating with the said back face to hold a bag stack therebetween.

6. Apparatus as described in claim 1, wherein one jaw has a downwardly projecting lip providing a front welding face, and a back clamping face;

and including a clamping bar cooperating with the back face to hold a bag stack therebetween; and a stack-welding device is provided on the said back clamping face of said lip;

said stack welding device comprising an electrically heated wire or band.

7. Apparatus as described in claim 1, including a first bar disposed downstream and shiftable parallel to one of said jaws, and a second bar opposed to and cooperating with the first bar for clamping therebetween successively severed bag sections in stacked relation.

8. Apparatus as described in claim 7, wherein said second bar is provided with a stack-welding device on a bag section clamping face opposed to the first bar.

9. Apparatus as described in claim 6, wherein said stack welding device is covered by a heat resistant clock or sheet.

10. Apparatus as described in claim 1, for fabrication from thermoplastic synthetic plastic film, of pad-stacked bags or like packaging, wherein individual bags are torn off from a pad which preferably have a suspension portion, from which a bag portion proper is separable along a perforation line, by severing web sections, each corresponding to a bag, from a leading end of an incrementally advanced continuous flattened tubular film web, and bringing the sections as severed successively into a pad stack being formed, said apparatus further comprising:

a severing blade associated with a said jaw on a side of the jaw toward the direction of web-advance movement, for severing individual bag sections from a film web, and immediately beyond the severing device in said direction, a stacking device;

said stacking device including stack support means providing a first element extending transverse to the web width on one side of the web path for supporting at least the trailing severed end portion of bag sections, a bar opposed parallel to the said surface, and movable toward the web path to carry successive bag sections to stacked relation against the first element, electrically heated stack welding means carried by the said bar to weld each newly delivered bag with a previously stacked bag section on the stack, with penetrating welding over the width of the bag section; and web section piecing means projecting from the said support means for retaining a stack engaged by and supported by the first bar.

11. Apparatus as described in claim 2, wherein one jaw is heated and has a downwardly projecting lip providing a front welding face and a back face;

said apparatus including:

a heat resistant fabric band substantially equal in width to the length of said one jaw, rollers secured above and below said jaw remote from said lip as supply and wind-up rollers for said band, the band running forward over the front of said one jaw element and, its welding face, back under said lip.

12. Apparatus as described in claim 2, including a first bag clamping bar mounted beneath one of said jaws and horizontally shiftable to and from said web and relative to said one jaw, and spring means biasing said clamping bar in a horizontal plane toward said web, whereby said bar is movable away from said web against the pressure of said spring means.

13. Apparatus as described in claim 12, wherein said bag clamping bar bears an elastomeric facing on its bag clamping surface.

14. Apparatus as described in claim 12, including a second bar disposed parallel to and normally on the opposite side of said web from the clamping bar, and having a web-engaging face;

said second bar as a pressure bar being movable across the web path toward, and for shifting a web section against, a clamping face of said clamping bar.

15. Apparatus as described in claim 14, including spring means biasing said pressure bar away from said clamping bar; and eccentric means for moving said pressure bar toward the clamping bar against the bias pressure of said spring means.

16. Apparatus as described in claim 14, wherein said pressure bar has a longitudinal passage as an air manifold discharging through longitudinally distributed air nozzle means toward said clamping bar.

17. Apparatus as described in claim 14, wherein said pressure bar has a longitudinal passage as a vacuum manifold, and is provided with longitudinally spaced suction apertures opening through said web-engaging face disposed toward the bag clamping bar.

18. Apparatus as described in claim 17, wherein the pressure bar is provided on said web-engaging face with an elastomeric facing through which the said suction apertures open.

19. Apparatus as described in claim 14, including a plurality of web section impaling pins, spaced longitudinally along, and projecting, from said clamping bar toward the pressure bar, through a clamping bar face cooperating as a clamping face with the pressure bar.

20. Apparatus as described in claim 19, wherein said pins are axially movable to accommodate an increasing thickness of bag sections impaled thereon.

21. Apparatus as described in claim 20, wherein said pins are moved by eccentric means against resisting return-spring pressure.

22. Apparatus as described in claim 14, including a narrow electrically heated welding device extending longitudinally along an upper margin of said clamping face of the pressure bar.

23. Apparatus as described in claim 2, including a bag clamping bar mounted beneath one of said jaw elements horizontally shiftable to and from said web and relative to said one element, and having a section engaging and clamping face;

means providing a stacking table for horizontal stacking of bag sections severed from the web, said table secured to the bottom of the clamping bar and providing a stack support surface aligned with said clamping face and extending downwardly therefrom roughly vertically, a second bar disposed parallel to and normally on the opposite side of said web from the clamping bar, and having a web-engaging face;

said second bar as a pressure bar movable across the web path toward, and for shifting a web section against, the clamping face of said claping bar.

24. Apparatus as described in claim 23, wherein said stacking table is supported at its lower end on a horizontal pivot;

said apparatus including motor means acting on said table to shift the table about the pivotal axis and therewith the clamping bar by an amount releasing bag sections horizontally stacked between the clamping bar and a clamping back face provided by a dependent lip on said one jaw element.

25. Apparatus as described in claim 1, including a pair of opposed cooperating web advance rolls above said jaws; and web feed guide means mounted above said rolls, said guide means comprising two comb-like arrays of small parallel tubes supported on and providing air discharges from respective air manifold pipes, the arrays disposed in respective planes adjacently parallel to opposite sides of said web.

26. Apparatus as described in claim 25, wherein the advance rolls are provided with circumferential grooves to accommodate respective individual tubes.

27. Apparatus as described in claim 25, including a vertically shiftable frame supporting said arrays; and cam means for timed raising and lowering said frame with web feed.

28. Apparatus as described in claim 2, wherein both said jaws are movable by cam means; and including a bar disposed parallel to and normally on one side of said web and as a pressure bar by second cam means movable across the web path for shifting a web section in a horizontal stacking action;

a pair of opposed cooperating web advance rolls above said jaws;

web feed guide means mounted above said rolls comprising two comb-like arrays mounted on a frame vertically shiftable by third cam means and thereby movable up and down in respective vertical planes adjacently parallel to opposite sides of said web;

said first cam means comprising rotary cams supported on respective drive shafts extending parallel to the said jaws and substantially in the horizontal plane of movement thereof, said second cam means including rotary cams on one of said drive shafts and said third cam means comprising rotary cam means on both said drive shafts.

29. Apparatus as described in claim 1, including a bag clamping bar mounted beneath one of said jaws and horizontally shiftable to and from said web and relative to said one jaw;

a second bar disposed parallel to and normally on the opposite side of said web from the clamping bar, and having a web-engaging face, said second bar as a pressure bar movable across the web path toward, and for shifting a web section against, a clamping face of said clamping bar; and a rake structure associated with and horizontally movable with said second bar and including vertical pins disposed at the web-engaging face of the second bar for flattening a severed bag section transferred upon said clamping bar.

30. Apparatus as described in claim 29, wherein said rake is movable toward the clamping bar initially only in a horizontal plane and thereafter simultaneously in a vertical plane.

31. Apparatus as described in claim 29, wherein the web-engaging face of the pressure bar is provided with forwardly opening, vertically running recesses in which the pins of the rake structure are vertically movable.

32. Apparatus as described in claim 29, including a plate in said rake structure carrying said pins and supported by the pressure bar in vertically shiftable relation thereto.

33. Apparatus as described in claim 32, wherein the pin-carrying plate of the rake structure carries at its both ends slide post pins vertically axially displaceable in ball bearing sleeves carried at the respective ends of said pressure bar.

34. Apparatus as described in claim 33, including at both ends of said plate, plate support wheels rolling on respective guiding rails;

said guiding rails being disposed on out-rigger levers, swingable about a common horizontal axis;

cam follower rollers on the lever ends disposed remotely from the guiding rails; and rotary driven cams followed by the respective rollers, for swinging the guide rails and thereby vertical shifting of said rake structure.

35. Apparatus as described in claim 29, wherein one of said jaws has a downwardly projecting longitudinally extending lip affording a vertically directed clamping back face cooperating with the said clamping bar to hold successively horizontally stacked bag sections.

36. Apparatus as described in claim 29, wherein the upper surface of the clamping bar slopes downwardly rearwardly in the direction away from a downward lip porjection of a proximate jaw.

37. Apparatus as described in claim 29, wherein said clamping bar on its said clamping face has an insulating surfacing lamination, preferably of a rubber-like elastomeric material.

38. Apparatus as described in claim 29, wherein the web-contacting face of one said jaw has insulating surfacing lamination, particularly of a silicone glass cloth.

39. Apparatus as described in claim 1, including stacking means beneath said severing device for horizontally stacking bag sections severed from said web and holding a resultant stack in pendent disposition;

a lay-off table comprising a conveyor belt frame pivotal about a horizontal axis and provided with a generally horizontal conveyor belt, at one end of the belt beneath said means, a clamping device shiftable away from the belt end to open a pendent-stack-accommodating space, and shiftable toward the belt end of clamp therebetween a said stack, and stack shift or transfer means including a shift bar swingable about a horizontal axis for laying the upper portion of a bag section stack over onto said conveyor belt, upon clamping by the clamping device and release from the stacking device.

40. Apparatus as described in claim 39, including a pressure roll pivotal about a horizontal axis from a point above the conveyor belt downwardly into retaining contact with a said stack layed on the belt by said shift device.

41. Apparatus as described in claim 40, including fluid cylinder means for lifting said conveyor frame pivotally about said horizontal axis; and fluid cylinder means for actuating said clamping device.

42. Apparatus as described in claim 39, wherein said lay-off table is vehicularly movable from place to place.

43. Apparatus as described in claim 39, including a perforating or hole-punching type tool device disposed between the bag stacking device and the lay-off table.

44. Apparatus as described in claim 43, wherein the said tool device is supported by housing structure of the bag stacking means.

45. Apparatus as described in claim 1, for manufacturing bags from a tube of thermoplastic film longitudinally advanced as a continuous web, and for stacking sections cut off from the leading or forward web end in lengths corresponding to respective bags and welding the sections into a bag pad, said apparatus comprising:

means advancing the web along a predetermined path;

said severing device including cooperating web severing jaws on respective opposite sides of the web path;

at least one of said jaws being movable to and from said path, for severing a length of material from the web as a said bag section;

support means including a web-engaging bar adjacent the discharge side of, and extending parallel to said jaw means, providing a surface disposed on one side of and parallel to the web path;

bar means opposite the said bar and cooperating therewith to grip therebetween a trailing end of a newly severed bag section or a stack of bag sections, until each newly severed bag section lies flat in a stacking location on the support means;

said bar means and bar being relatively displaceable in a direction perpendicular to the web path; and retaining means having with respect to the support means a movable relation and cooperating with the support means to hold the bag or stack of bags on the support means at least roughly parallel to the direction of the web path.

46. Apparatus as described in claim 2, for manufacturing bags from a tube of thermoplastic film longitudinally advanced as a continuous web, and for stacking sections cut off from the leading or forward web end in lengths corresponding to respective bags and welding the sections into a bag pad, said apparatus comprising:

means advancing the web with forward end descending in substantially vertical disposition;

said severing device including cooperating horizontal web severing jaws in respective opposite sides of the web descent path, at least one of said jaws being movable horizontally to and from said path, for severing a length of material from the web as a said bag section;

support means including a web-engaging bar extending parallel to and below said jaws providing a vertical surface and disposed on one side of the web path;

bar means opposite the bar and cooperating therewith to grip therebetween an upper end of a newly severed bag section or a stack of bag sections dependently disposed, until each newly severed bag section lies flat in a horizontal stacking location on the support means;

said bar means and bar being relatively horizontally displaceable; and retaining means having a horizontally movable relation with respect to the support means for cooperating with the support means to hold the bag or stack of bags at least roughly vertically dependent on the support means.

47. Apparatus as described in claim 1, for fabrication from thermoplastic synthetic plastic film, of pad-stacked bags or like packaging, wherein individual bags are torn off from a pad which preferably have a suspension portion, from which a bag portion proper is separable along a perforation line, by severing web sections, each corresponding to a bag, from a leading end of an incrementally advanced continuous flattened tubular film web, and bringing the sections as severed successively into a pad stack being formed, said apparatus comprising:

a severing device for severing individual bag sections from a film web, and immediately beyond the severing device, a stacking device;

said stacking device including a first bar transverse to the web width on one side of the web, a second bar opposed parallel to the first, and movable toward the web path to carry successive bag sections to stacked relation against the first bar, and an electrically heated glow strip or impulse strip preferably to weld each newly delivered bag section with a previously stacked bag on the bag stack, along a penetrating welding seam extending over the width of the bag section;

and means for retaining a stack engaged by and supported by the first bar.

48. Apparatus as described in claim 46, wherein upstream, on the feed side of said bars, there is provided a web welding device comprised of two opposed jaws, and the severing device is constituted by a severing blade and an opposed counterblade;

said welding device and severing device being distinct assemblies separate from one another but commonly actuated;

said means for maintaining the stack comprising web section impaling stacking pins supported by the first said bar;

said pins incorporated in the assembly including the severing knife.

49. Apparatus as described in claim 48, wherein said stacking pins are secured on a pin carrier bar shiftable, in said first bar, in disposition parallel relative to the severing knife, to advance and retract the pins to and from a position projecting beyond a clamping face of the first bar.

50. Apparatus as described in claim 49, wherein the pin carrier bar is spring-biased in one direction to retract the pins inwardly relative to the first bar, and is shifted in the other direction to extend the pins, against the force of spring bias, by a piston cylinder unit.

51. Apparatus as described in claim 50, wherein the stacking pins engage in respective die-like recesses of the opposed said second bar;

said second bar being a carrier for the impulse heated stack welding strip for joining the successive bag sections into a pad.

52. Apparatus as described in claim 48, wherein the working face upper edge of the second bar provides an anvil or shear counter blade edge for the severing knife, and the second bar is disposed in a slotted support beam and shiftable into the support beam against spring bias.

53. Apparatus as described in claim 52, wherein the severing-knife-carrying bar and also the thereto opposed said slotted support beam are provided with coolant passage.

54. Apparatus as described in claim 51, wherein above the stacking-pin-tip receiving, die-like recesses of the second bar, there is located a groove to receive the projecting blade edge of the severing knife.

55. Apparatus as described in claim 51, wherein the stack welding strip is disposed on the said second bar on the downstream side of the stacking pins projecting from the clamping face of the first bar.

56. Apparatus as described in claim 48, wherein the severing knife is shiftable out of or removable from the region of the web path, and the welding device is a severing welding device operating through a welding wedge to also effect severance of the bag sections from the film web while welding bag walls.

57. Apparatus as described in claim 48, wherein the severing knife is received in a support beam to which is secured the first said bar.

58. Apparatus as described in claim 48, wherein one of the welding device jaws is stationarily disposed.

59. Apparatus as described in claim 58, wherein the first said bar is stationarily disposed and is offset, from the web, back behind the welding surface of the stationary welding jaw; and wherein the stacking pins project through the first said bar and extend beyond the welding surface of the stationary welding jaw.

60. Apparatus as described in claim 59, wherein the second said bar, to accommodate increasing stack thickness, is displaceable, against the extending force of a bias spring, on a rod engaged on the moveable welding jaw.

61. Apparatus as described in claim 48 including
an incising device, upstream relative to the stacking device, for incising in one web wall, a somewhat flat-bottomed U-shaped cut with the cut bottom extending transversely of the web; and
means associated with one of said devices for producing a transverse perforation line intersecting the legs of the U and serving for separation of a bag portion from a hanger portion.

62. Apparatus as described in claim 10, wherein a series of spaced needles arrayed transversely of the web path provides said piercing means.

* * * * *